US012496838B2

(12) United States Patent
Taira et al.

(10) Patent No.: US 12,496,838 B2
(45) Date of Patent: Dec. 16, 2025

(54) PRINTING APPARATUS

(71) Applicant: CANON KABUSHIKI KAISHA, Tokyo (JP)

(72) Inventors: Ryutaro Taira, Kanagawa (JP); Takeshi Koda, Kanagawa (JP); Toshiro Sugiyama, Kanagawa (JP); Takayuki Okamoto, Kanagawa (JP); Shinya Asano, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 147 days.

(21) Appl. No.: 18/584,769

(22) Filed: Feb. 22, 2024

(65) Prior Publication Data

US 2024/0286420 A1 Aug. 29, 2024

(30) Foreign Application Priority Data

Feb. 24, 2023 (JP) ................................ 2023-027511

(51) Int. Cl.

*B41J 11/00* (2006.01)
*B41J 29/38* (2006.01)
*B41J 2/01* (2006.01)

(52) U.S. Cl.

CPC .......... *B41J 11/007* (2013.01); *B41J 11/0022* (2021.01); *B41J 11/0024* (2021.01); *B41J 11/0095* (2013.01); *B41J 29/38* (2013.01); *B41J 2/01* (2013.01); *B41J 11/002* (2013.01)

(58) Field of Classification Search

CPC ... B41J 11/007; B41J 11/0022; B41J 11/0024; B41J 11/0095; B41J 29/38; B41J 2/01; B41J 11/002

See application file for complete search history.

(56) References Cited

U.S. PATENT DOCUMENTS

| | | | | |
|---|---|---|---|---|
| 2013/0135651 | A1* | 5/2013 | Sumioka | B41J 11/002 358/1.13 |
| 2014/0111586 | A1 | 4/2014 | Kumai | |
| 2016/0332462 | A1* | 11/2016 | Harayama | B41J 11/0022 |
| 2019/0344586 | A1* | 11/2019 | Kawai | B65H 23/26 |
| 2021/0039382 | A1* | 2/2021 | Llorach To | B41J 11/002 |
| 2022/0410593 | A1 | 12/2022 | Yoda | |

FOREIGN PATENT DOCUMENTS

JP 6036158 B2 11/2016

* cited by examiner

*Primary Examiner* — Henok D Legesse

(74) *Attorney, Agent, or Firm* — Canon U.S.A., Inc. IP Division

(57) ABSTRACT

A printing apparatus includes a drying unit configured to be movable to a first operating position where a print medium subjected to printing by a printing unit is dried, and to a first retracted position retracted from the first operating position. The apparatus also includes a supporting unit provided facing the drying unit and configured to be movable independently of the drying unit to a second operating position where the print medium to be dried by the drying unit is supported, and to a second retracted position retracted from the second operating position.

20 Claims, 27 Drawing Sheets

PRINTING APPARATUS

BACKGROUND

Field of the Disclosure

The present disclosure relates to a printing apparatus including a drying unit configured to dry liquid.

Description of the Related Art

In recent years, it has become possible for inkjet printing apparatuses in a field of sign and display to perform printing on a print medium made of a wide variety of materials such as coated paper, non-coated paper, cloth, vinyl chloride-based materials, and polyester-based materials. The printed matter that has been printed is used for a variety of indoor and outdoor applications such as outdoor signboards, indoor graphics, and vehicle wrapping.

In such an inkjet printing apparatus, high-precision and high-quality image quality, and high-speed printing, not to mention water resistance and weather resistance of printed matter are required. To realize such requirements, a method of heating the print medium to accelerate fixing of ink or a method of drying ink landed on the print medium, by using a heating unit such as a heater is frequently used.

A printing apparatus that dries the print medium after printing is configured such that an ink fixing unit is arranged at a downstream side of the print head (at the discharge port of the front side of the apparatus) and the ink is dried and fixed. There is a problem in the aforementioned configuration that the apparatus main body must be enlarged because an ink fixing unit that performs fixing and a discharging guide unit that supports the print medium in fixing need to be arranged. In addition, since the aforementioned configuration may cause reduced operability with respect to various operations performed by a user, a configuration is proposed which allows movement of the ink fixing unit and the discharging guide unit to improve the operability.

In Japanese Patent No. 6036158, a configuration that facilitates moving an apparatus to a place having a narrower frontage when the apparatus is moved is proposed, in which the depth dimension of the main body is reduced by moving a curing unit including the ink fixing unit and the discharging guide unit.

On the other hand, it is desirable, for a printing apparatus that uses a roll shape print medium, to provide a roll setting unit at the front side of the main body in order to improve the operability of setting the roll shape print medium to the printing apparatus. Here in a case of a printing apparatus provided with the ink fixing unit at the front side of the main body as described above, setting a roll may be obstructed by the ink fixing unit and the discharging guide unit. Accordingly, improvement of the operability is proposed by configuring the ink fixing unit and the discharging guide unit to be movable upward of the apparatus.

However, in such a structure, for example a configuration of Japanese Patent No. 6036158, the ink fixing unit and the discharging guide unit supporting the print medium move as one and thus, if the leading end of the print medium is located within the movement region of the ink fixing unit and the discharging guide unit, those units cannot be moved. Therefore, the leading end of the print medium must pass through a gap between the ink fixing unit and the discharging guide unit in a state where the units have returned to each predetermined position.

Additionally, in order to efficiently perform ink fixing, it is necessary to deliver hot air to the print medium before the heat and the wind speed generated by the ink fixing unit decrease, and thus the distance (referred to as gap, in the following) between the ink fixing unit and the discharging guide unit cannot be widened. Furthermore, as the print medium that has been wound in a roll shape is still curled, it is difficult for the leading end of the print medium to enter the gap in conveying the print medium. The foregoing may cause paper jam.

SUMMARY

The present disclosure, which has been made in view of the aforementioned problems, aims to suppress occurrence of paper jam while improving operability of the printing apparatus.

According to a first aspect of the present disclosure, there is provided a printing apparatus comprising: a drying unit configured to be movable to a first operating position where a print medium subjected to printing by a printing unit is dried, and to a first retracted position retracted from the first operating position; and a supporting unit provided facing the drying unit and configured to be movable independently of the drying unit to a second operating position where the print medium to be dried by the drying unit is supported, and to a second retracted position retracted from the second operating position.

Further features of the present disclosure will become apparent from the following description of exemplary embodiments with reference to the attached drawings.

BRIEF DESCRIPTION OF THE DRAWINGS

FIGS. 8A-1 and 8A-2 are flowcharts illustrating a setting operation of a roll shape print medium;

FIGS. 9A-1 and 9A-2 are flowcharts illustrating another example of the setting operation of the roll shape print medium;

FIGS. 12A-1 and 12A-2 are flowcharts illustrating a setting operation of the roll shape print medium according to the second embodiment;

DESCRIPTION OF THE EMBODIMENTS

Figure 1:
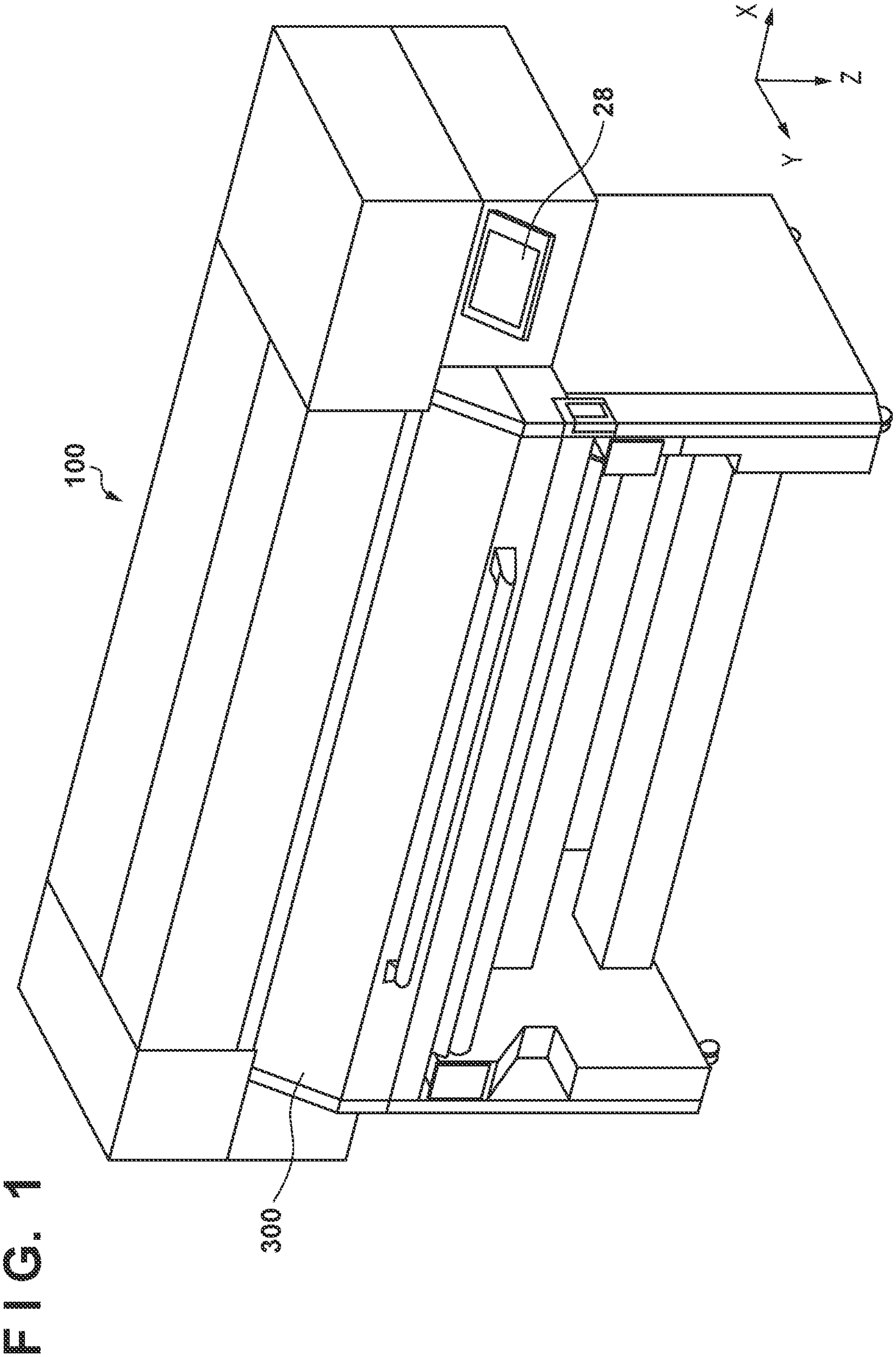
FIG. 1 is a perspective diagram of a printing apparatus according to a first embodiment of the present disclosure.

Hereinafter, embodiments will be described in detail with reference to the attached drawings. Note, the following embodiments are not intended to limit the scope of the claimed disclosure. Multiple features are described in the embodiments, but limitation is not made to a disclosure that requires all such features, and multiple such features may be combined as appropriate. Furthermore, in the attached drawings, the same reference numerals are given to the same or similar configurations, and redundant description thereof is omitted.

First Embodiment

<Basic Configuration of Apparatus>

Figure 2:
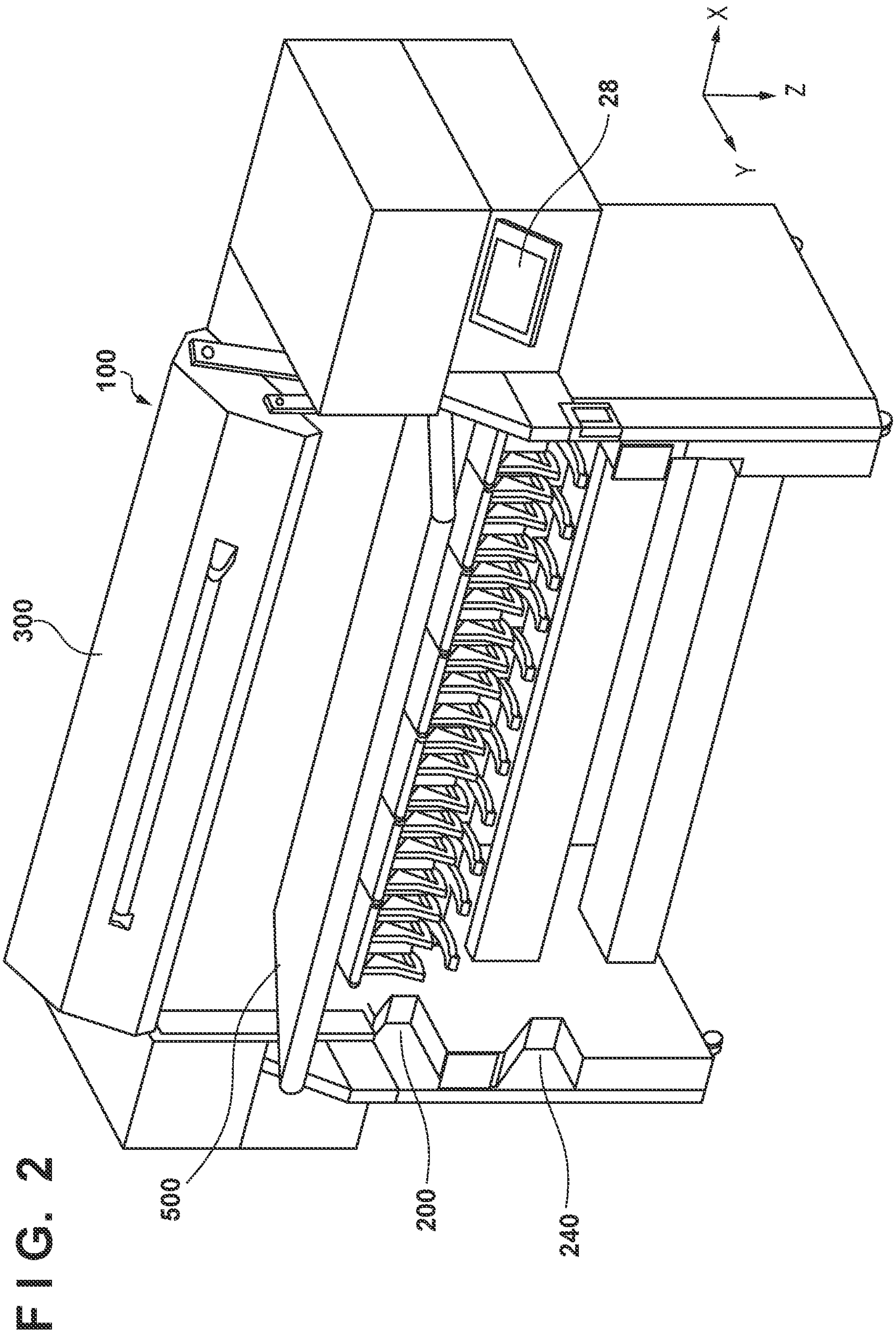
FIG. 2 is a perspective diagram of the printing apparatus according to the first embodiment of the present disclosure.

FIG. 1 and FIG. 2 are diagrams illustrating a basic configuration of an inkjet printing apparatus (referred to as printing apparatus, in the following) 100 according to a first embodiment of the present disclosure.

FIG. 1 is a diagram illustrating a state where an ink fixing unit 300 described below and a discharging guide unit 500 (see FIG. 2) are set at a fixing position (predetermined position, in an operating state). In addition, FIG. 2 is a diagram illustrating a state where the ink fixing unit 300 and the discharging guide unit 500 are set at a retracted position.

In FIG. 1, the printing apparatus 100 according to the present embodiment includes a supply unit configured to supply a print medium 1 from a roll shape print medium 10 (see FIG. 4) in which the print medium 1 is wound, and a printing unit configured to print an image on the print medium 1. In addition, the printing apparatus 100 includes a roll-up apparatus configured to roll up the print medium 1 subjected to printing by the printing unit. In addition, in setting the roll shape print medium 10, the printing apparatus 100 is brought in a state where the ink fixing unit 300 and the discharging guide unit 500 are open as illustrated in FIG. 2, and in this state the roll shape print medium 10 is set in the printing apparatus 100.

When the discharging guide unit 500 is in a closed state, the print medium 1 drawn from the roll shape print medium 10, which is set in the roll setting unit 200, passes through the conveyance unit and reaches the printing unit by which an image is printed. The print medium 1 subjected to printing is discharged toward the discharging guide unit 500, and also dried and fixed in the ink fixing unit 300. In addition, by setting a roll-up roll 520 in a roll-up roll setting unit 240, the discharged print medium 1 can be rolled in a roll shape.

The user can input, by using various switches provided in the operation panel 28, various commands to the printing apparatus 100, such as specification of the size of the print medium 1 and setting of the type of roll.

Figure 3:
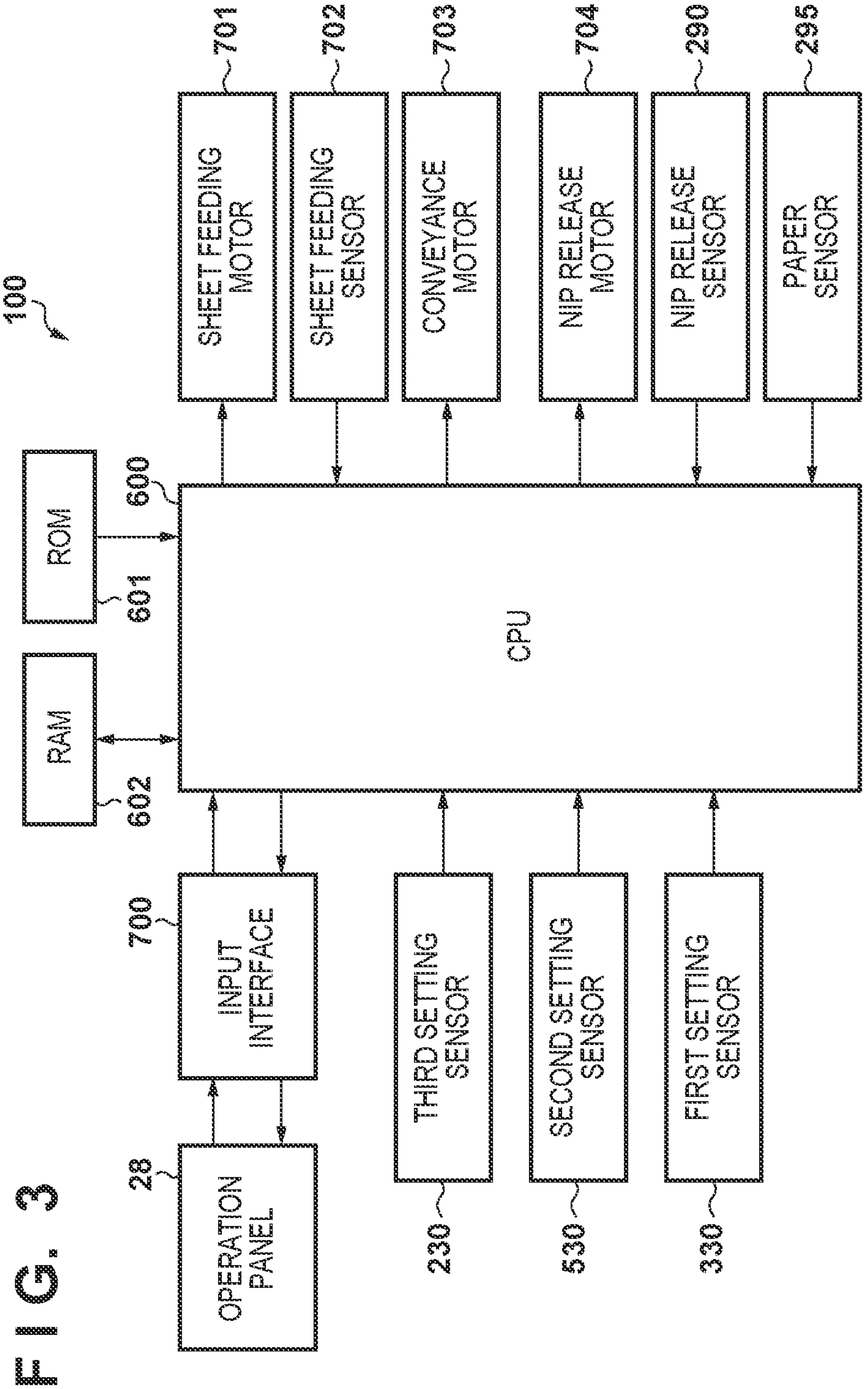
FIG. 3 is a block diagram of the printing apparatus.

Next, FIG. 3 is a diagram illustrating a block configuration of the printing apparatus 100. Here in FIG. 3, only the blocks related to setting and conveyance of the print medium 1 are illustrated, which is the scope of the present disclosure, and the printing unit, which performs a printing operation with respect to the print medium 1, and other components are omitted.

In FIG. 3, the printing apparatus 100 includes an operation panel 28 configured to accept user operations, and the operation panel 28 is connected, via an input interface 700, to a CPU 600 configured to control the entire printing apparatus 100. The CPU 600 controls each unit of the image printing apparatus 100 by deploying in a RAM 602 and executing a program stored in a ROM 601.

In addition, the printing apparatus 100 is arranged with a first setting sensor 330 configured to detect that the ink fixing unit 300 is set at a fixing position (operating position). In addition, a second setting sensor 530 configured to detect that the discharging guide unit 500 is set at the fixing position (operating position) is also arranged. Furthermore, a third setting sensor 230 configured to detect that the roll shape print medium 10 is set in the printing apparatus 100 is arranged.

In addition, the printing apparatus 100 includes a sheet feeding motor 701 serving as a supply unit configured to feed the print medium 1, a sheet feeding sensor 702 configured to detect sheet feeding of the print medium 1, and a conveyance motor 703 configured to convey, to the printing unit 400, the print medium 1 fed by the sheet feeding motor 701.

In addition, the printing apparatus 100 includes a nip release motor 704 configured to release a nip of a conveyance roller pair 280 described below, and a nip release sensor 290 configured to detect nip release of the conveyance roller pair 280. Furthermore, the printing apparatus 100 includes a paper sensor 295 configured to detect an end portion of the print medium 1.

Figure 4:
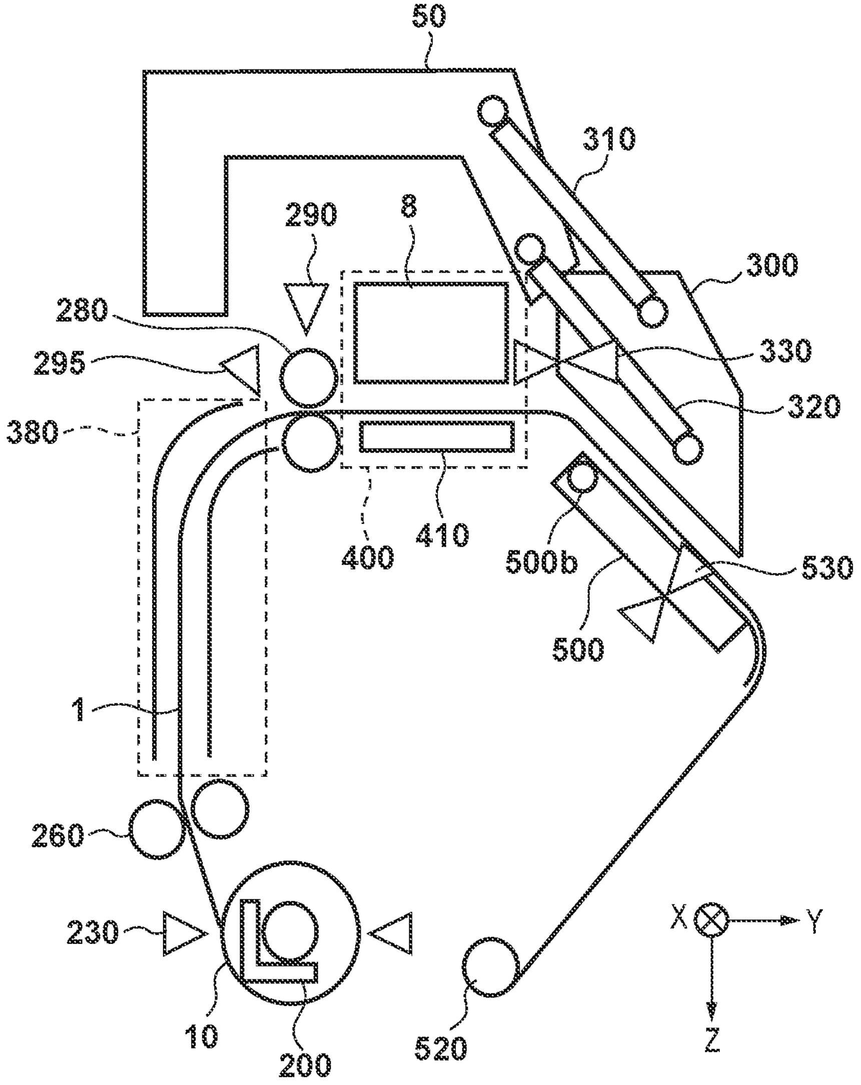
FIG. 4 is a schematic cross-sectional diagram of a main part of the printing apparatus.

Next, FIG. 4 is a schematic cross-sectional diagram of the main part of the printing apparatus 100.

In FIG. 4, the print medium 1 drawn from the roll shape print medium 10 set in the roll setting unit 200 is conveyed to the printing unit 400 and subjected to printing, then finally rolled up by the roll-up roll 520.

More specifically, the print medium 1 drawn from the roll shape print medium 10 set in the roll setting unit 200 is conveyed through a conveyance unit 380 to the printing unit 400 that can print an image. The printing unit 400 prints an image on the print medium 1 by ejecting ink from a print head 8. The print head 8 ejects ink from an ejection port by using an ejection energy generating element such as an electrothermal conversion element (heater) or a piezoelectric element. When an electrothermal conversion element is used, heat generated by the element causes ink to bubble, and the ink can be ejected from the ejection port utilizing the bubble generating energy. Although the following embodiments will be described taking an example of a print medium in a roll shape, the print medium of the present disclosure is not limited thereto and can also be applied to a case of printing on a sheet-type medium.

Here, the printing method of the print head 8 and the printing unit 400 is not limited to the inkjet type. A driving method for the print head 8 may be serial-scanning type or full-line type. In the case of serial-scanning type, an image is printed by a conveyance operation of the print medium 1 and scanning of the print head 8 in a direction crossing the conveyance direction of the print medium 1. In the case of full-line type, an image is printed by using a long size print head 8 in which ejection ports are extending across a region corresponding to the width of the print medium 1 in a direction crossing the conveying direction of the print medium 1, while the print medium 1 is continuously conveyed.

The printed print medium 1 is subjected to drying and fixing of the ink at the ink fixing unit 300. A well-known example of the ink fixing unit 300 is of a type that blows hot air to dry the ink. The print medium 1 subjected to drying and fixing of the ink is rolled up in a roll shape by a roll-up apparatus arranged with the roll-up roll 520.

<Description of Movement Mechanism of Fixing Unit 300 and Discharging Guide Unit 500>

A movement mechanism of the fixing unit 300 and the discharging guide unit 500 will be described, referring to cross-sectional diagrams of the main part of the printing apparatus 100 in FIG. 4 and FIG. 5.

Figure 5:
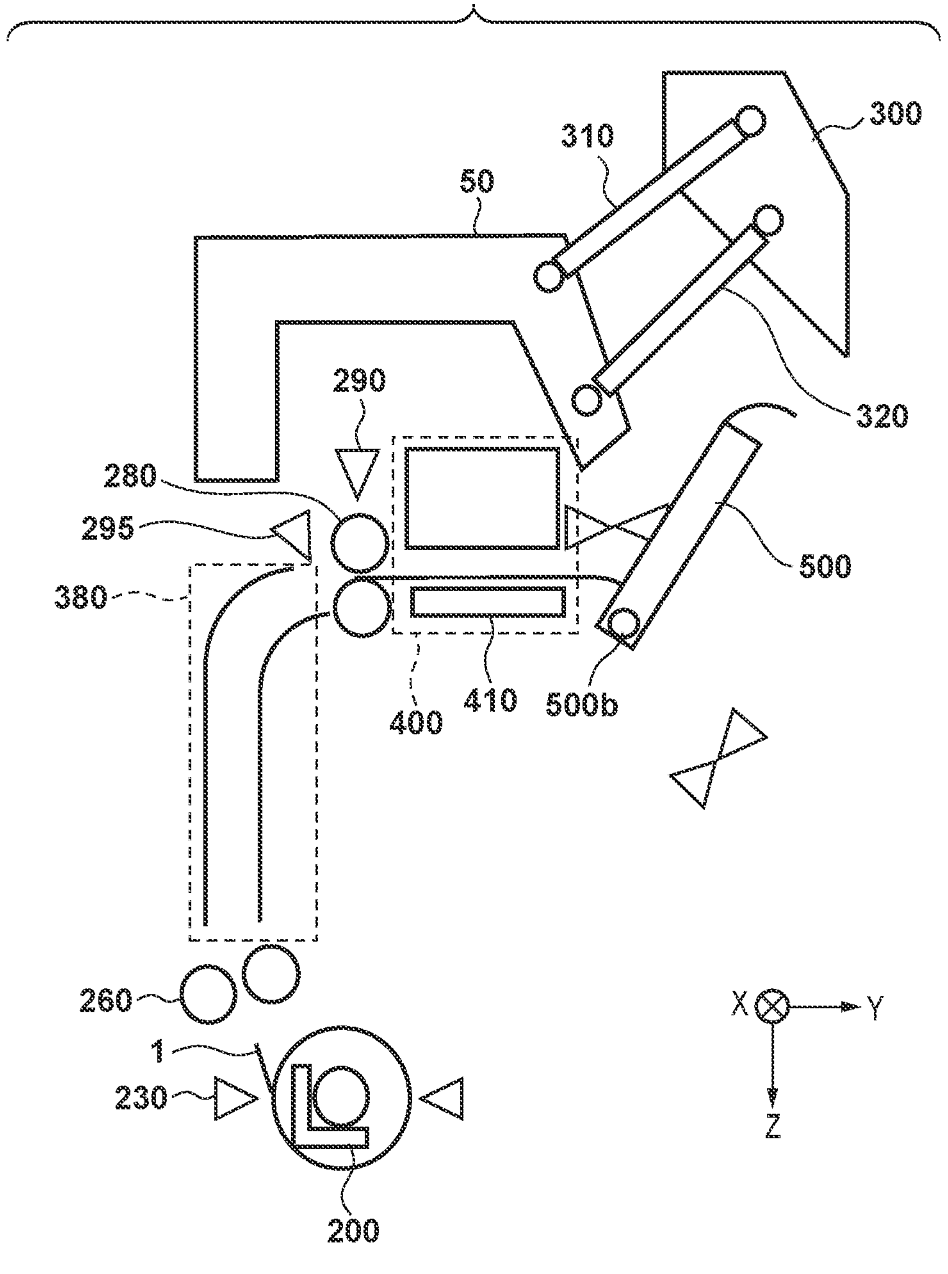
FIG. 5 is a schematic cross-sectional diagram of the main part of the printing apparatus.

In FIG. 4 and FIG. 5, the ink fixing unit 300 has a function as a drying unit that dries the printed ink by blowing hot air to the print medium 1. The ink fixing unit 300 according to the present embodiment, which is configured to dry by blowing hot air, includes a heater and a fan, for example. However, the ink fixing unit 300 is not limited thereto, and may be configured to include a fan to perform only air blowing, or may be configured to include only a heater to heat the print medium. The discharging guide unit 500 supports the print medium 1 from below to guide conveyance of the print medium 1. The discharging guide unit 500 is axially supported by a discharging guide shaft 500*b* to be pivotable with respect to the apparatus main body. The discharging guide unit 500 is arranged facing the ink fixing unit 300. The discharging guide unit 500 is thus configured to be movable independently of the ink fixing unit 300.

Regarding a first link 310 and a second link 320, each of which is a moving unit of the ink fixing unit 300, one end is axially supported by the apparatus main body 50 to be rotatable, and the other end is axially supported by the ink fixing unit 300 to be rotatable. The two links form a parallel-link mechanism. The configuration of the parallel-link as described above can reduce the movement region compared to a movement by simple rotation of the ink fixing unit 300, whereby a compact movement operation is realized. The aforementioned link mechanism is arranged at both end portions in the longitudinal direction (X-direction) of the ink fixing unit 300, respectively in a similar configuration. In other words, two links are arranged at each side and thus four links are arranged for both sides.

Next, a setting operation of the roll shape print medium 10 will be described. FIGS. 8A-1, 8A-2 and FIG. 8B are flowcharts illustrating a setting operation of the roll shape print medium 10 in the printing apparatus 100. In the following, description will be provided, referring to FIGS. 8A-1, 8A-2 and FIG. 8B, and also FIG. 4 to FIG. 7 which are cross-sectional diagrams of the main part of the printing apparatus 100.

First, the user manually moves the ink fixing unit 300 and the discharging guide unit 500 to upward respective retracted positions, as illustrated in FIG. 2 and FIG. 5. At this time, the ink fixing unit 300 is moved upward with a guide by the first link 310 and the second link 320, and the discharging guide unit 500 is moved pivoting around the discharging guide shaft 500*b*.

The printing apparatus 100 is arranged with a first setting sensor 330 configured to detect that the ink fixing unit 300 is set at a fixing position (operating position). Similarly, a second setting sensor 530 configured to detect that the discharging guide unit 500 is set at the fixing position (operating position) is arranged. The first setting sensor 330 and the second setting sensor 530 respectively detect that the ink fixing unit 300 and the discharging guide unit 500 are set at respective predetermined positions. The first setting sensor 330 and the second setting sensors 530 are photosensors, for example, which include a light emitting unit and a light receiving unit. By detecting that light reception is blocked at the time of setting, the sensors can detect that the ink fixing unit 300 and the discharging guide unit 500 is set at the predetermined positions. Here, the first setting sensor 330 may be a sensor that detects that the ink fixing unit 300 is set at the retracted position. Similarly, the second setting sensor 530 may be of a sensor that detects that the discharging guide unit 500 is set at the retracted position.

The CPU 600 determines whether or not the ink fixing unit 300 and the discharging guide unit 500 are located at the fixing position or the retracted position by the detection of the first setting sensor 330 and the second setting sensor 530. When the units are located at the fixing position, "open ink fixing unit" or "open discharging guide" is displayed on the operation panel 28 (S1 to S4 in FIG. 8A-1).

When both units are located at the retracted position as illustrated in FIG. 5, the roll setting unit 200 of the roll shape print medium 10 becomes visible to the user. The CPU 600 then displays "set roll sheet" on the operation panel 28, prompting the user to perform the operation (S5 in FIG. 8A-1). The user sets the roll shape print medium 10 (mounts in the apparatus main body) by aligning the end portion of the roll shape print medium 10 to the guide of the roll setting unit 200 of the apparatus main body, and pushing in the roll shape print medium 10. At this time, the ink fixing unit 300 and the discharging guide unit 500 are both in the upper retracted position as has been described above, the user's field of view and working area are sufficiently secured, and the user can easily set the roll shape print medium 10.

Here, a third setting sensor 230 configured to detect that the roll shape print medium 10 is set is arranged in the printing apparatus 100, and thus setting of the roll shape print medium 10 can be detected. The third setting sensor 230 is also a photosensor, which includes a light emitting unit and a light receiving unit. The third setting sensor 230 then can detect that the roll shape print medium 10 is set by detecting that light reception is blocked at the time of setting.

Figures 1, 8A:
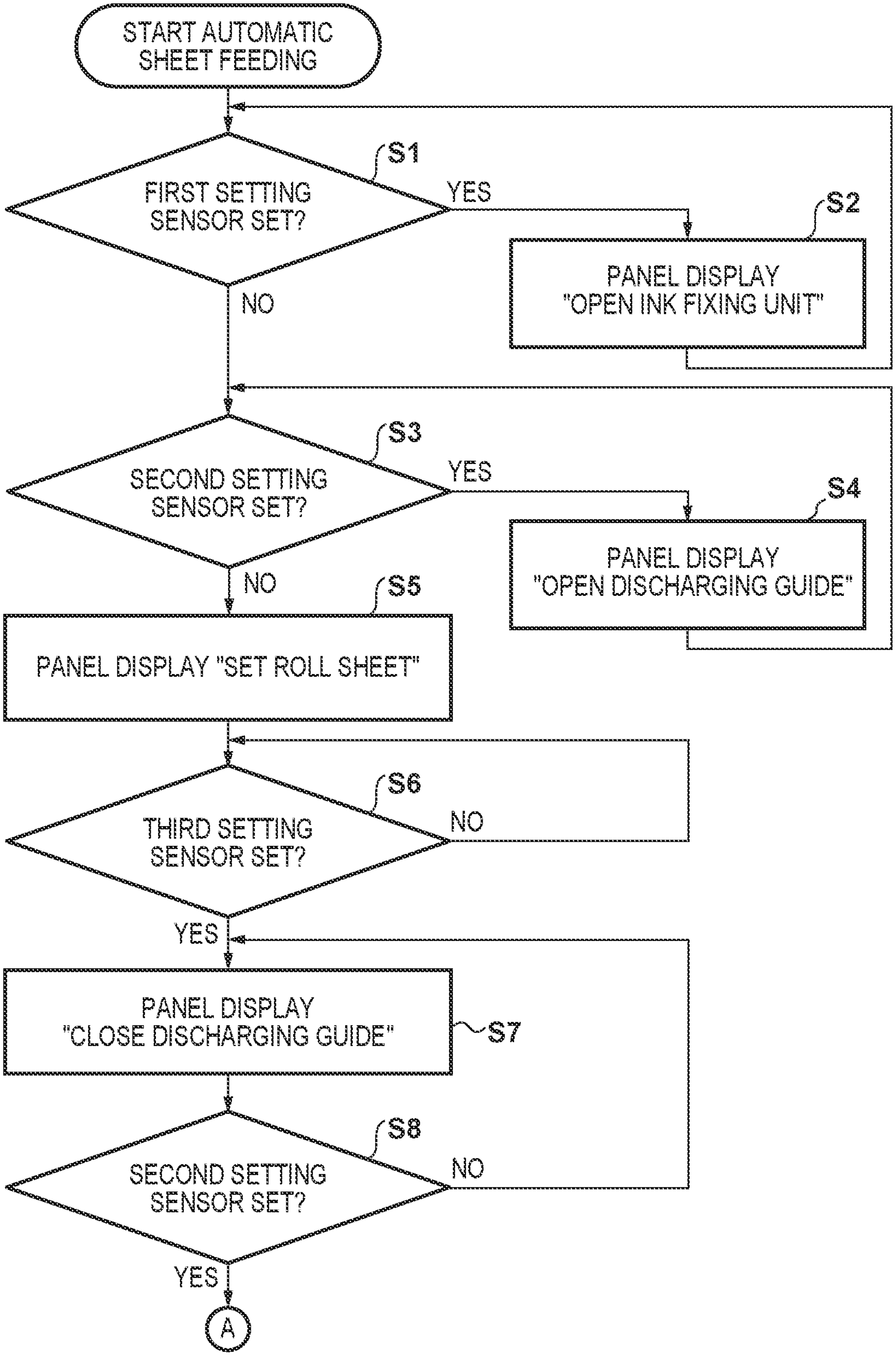
Figures 2, 8A:
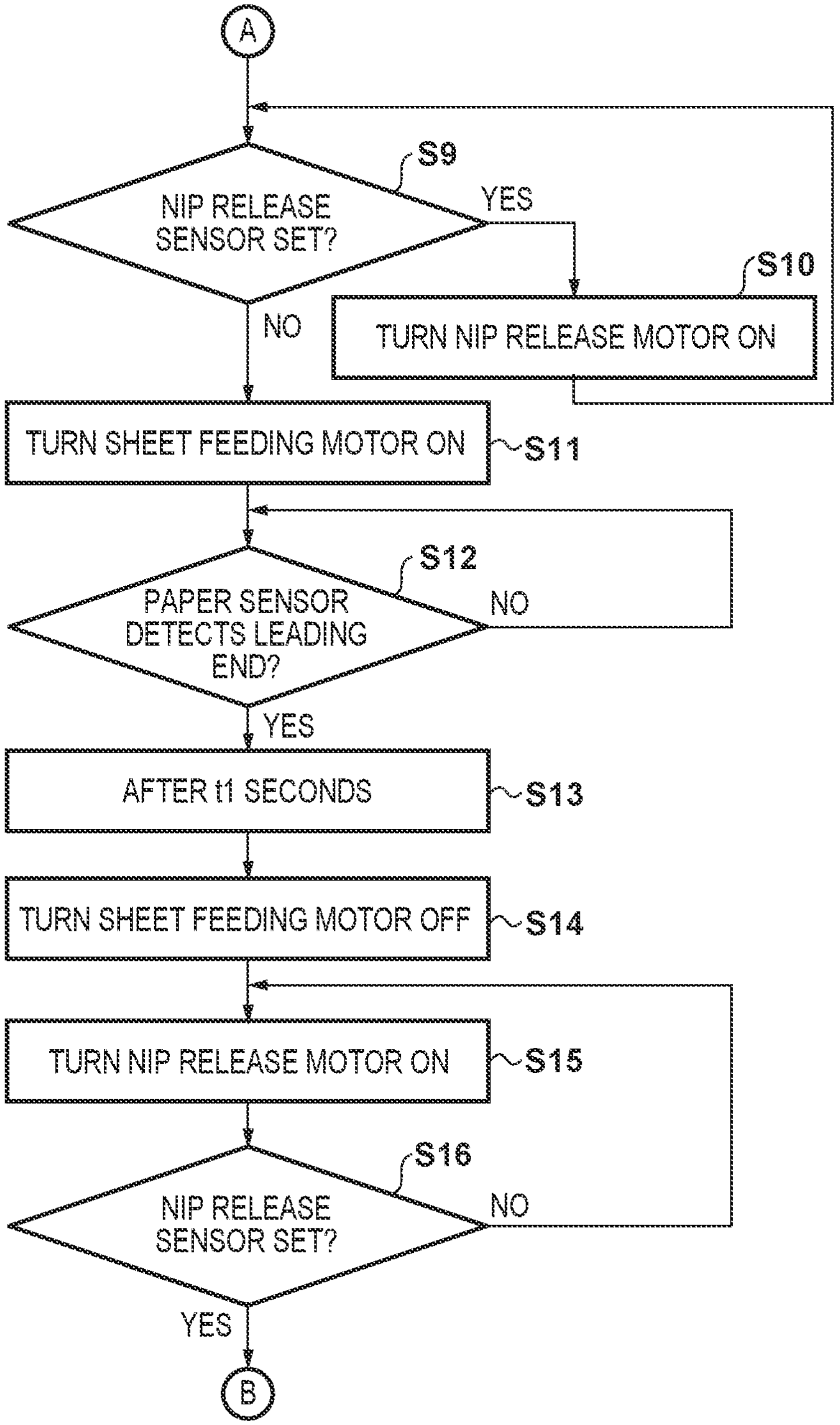

When the third setting sensor 230 detects that the roll shape print medium 10 is set, the CPU 600 displays "close the discharging guide" on the operation panel (S7 in FIG. 8A-1).

When the user closes the discharging guide unit 500 (moves it to the fixing position), the CPU 600, by using the second setting sensor 530, detects whether or not the discharging guide unit 500 is closed (S8 in FIG. 8A-1).

Figure 6:
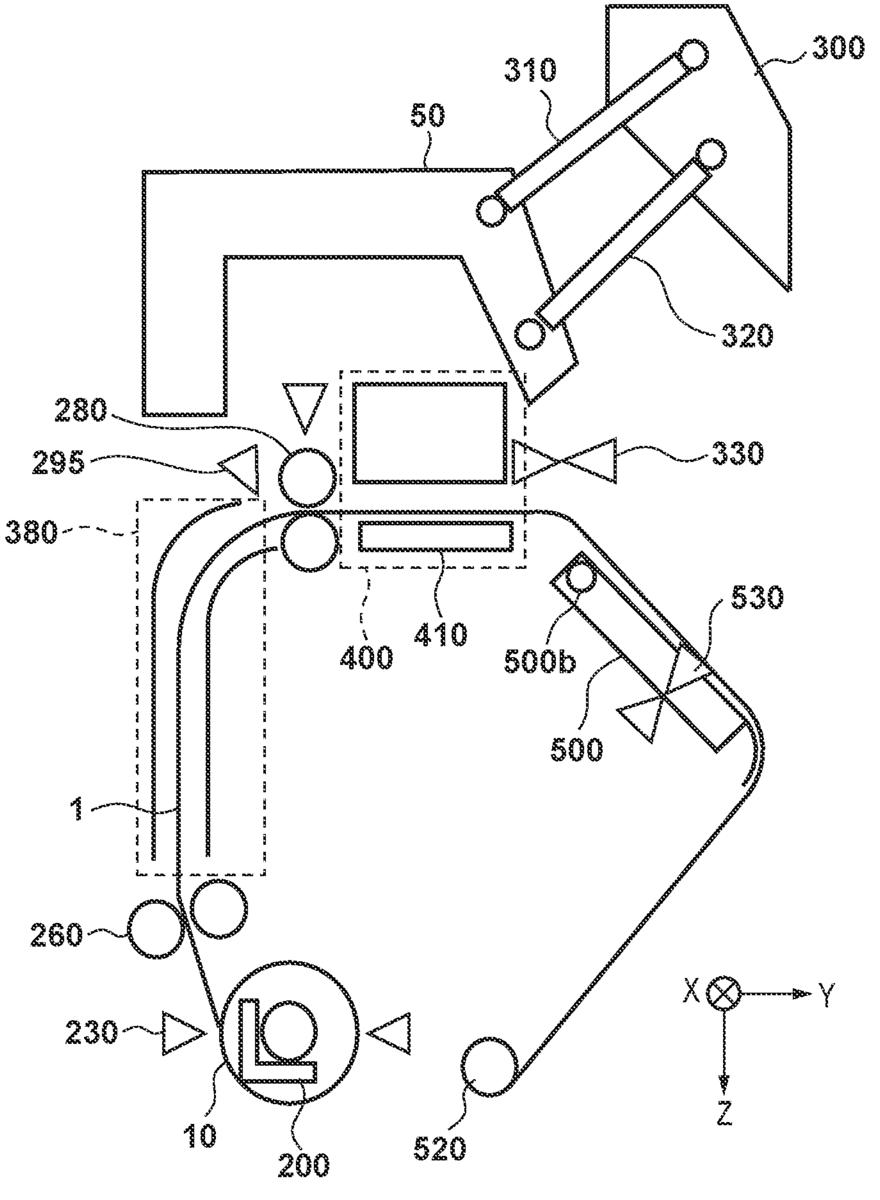
FIG. 6 is a schematic cross-sectional diagram of the main part of the printing apparatus.

As illustrated in FIG. 6, when detecting that the discharging guide unit 500 is closed, the CPU 600 rotates the roll shape print medium 10 by a driving unit (not illustrated), and nips the leading end of the print medium 1 by a pair of sheet feeding rollers 260. At this time, a nip release sensor 290 configured to detect a nip by the conveyance roller pair 280 is checked and, when the nip by the conveyance roller pair

280 is not released, a nip release motor 704 (not illustrated) is driven to release the nip (S9 to S10 in FIG. 8A-2). And then the pair of sheet feeding rollers 260 is driven by a sheet feeding motor 701 to convey the print medium 1 toward the conveyance unit 380 and the printing unit 400.

A paper sensor 295 configured to detect an end portion of the print medium 1 in the conveying direction is provided before the conveyance roller pair 280, whereby it is possible to detect the leading end of the print medium 1 at this position. The CPU 600 then turns off the sheet feeding motor 701 (S14 in FIG. 8A-2) t1 seconds (S13 in 8A-2) after the print medium 1 passed between the conveyance roller pair 280 and the leading end of the print medium 1 was detected by the paper sensor 295 (S12 in FIG. 8A-2). The print medium 1 is thus guided to the printing unit 400 (position of a platen 410). The value of t1 seconds is a preliminary set as a time until the print medium 1 reaches the platen 410, taking into account the distance from the paper sensor 295 to the platen 410 and the conveyance speed.

When the print medium 1 is guided to the platen 410, the CPU 600 drives the nip release motor 704 (S15 in FIG. 8A-2) to shift the conveyance roller pair 280 to a nipping state (S16 in FIG. 8A-2). And thus, the conveyance roller pair 280 nips the print medium 1. The CPU 600 then drives the conveyance motor 703 to drive the conveyance roller pair 280 for t2 seconds, and guides the print medium 1 to the discharging guide unit 500 (S17 in FIG. 8B). The value of t2 seconds is a preliminarily set as a time until the print medium 1 reaches the discharging guide unit 500, taking into account the distance from the platen 410 to the discharging guide unit 500 and the conveyance speed.

Figure 8B:
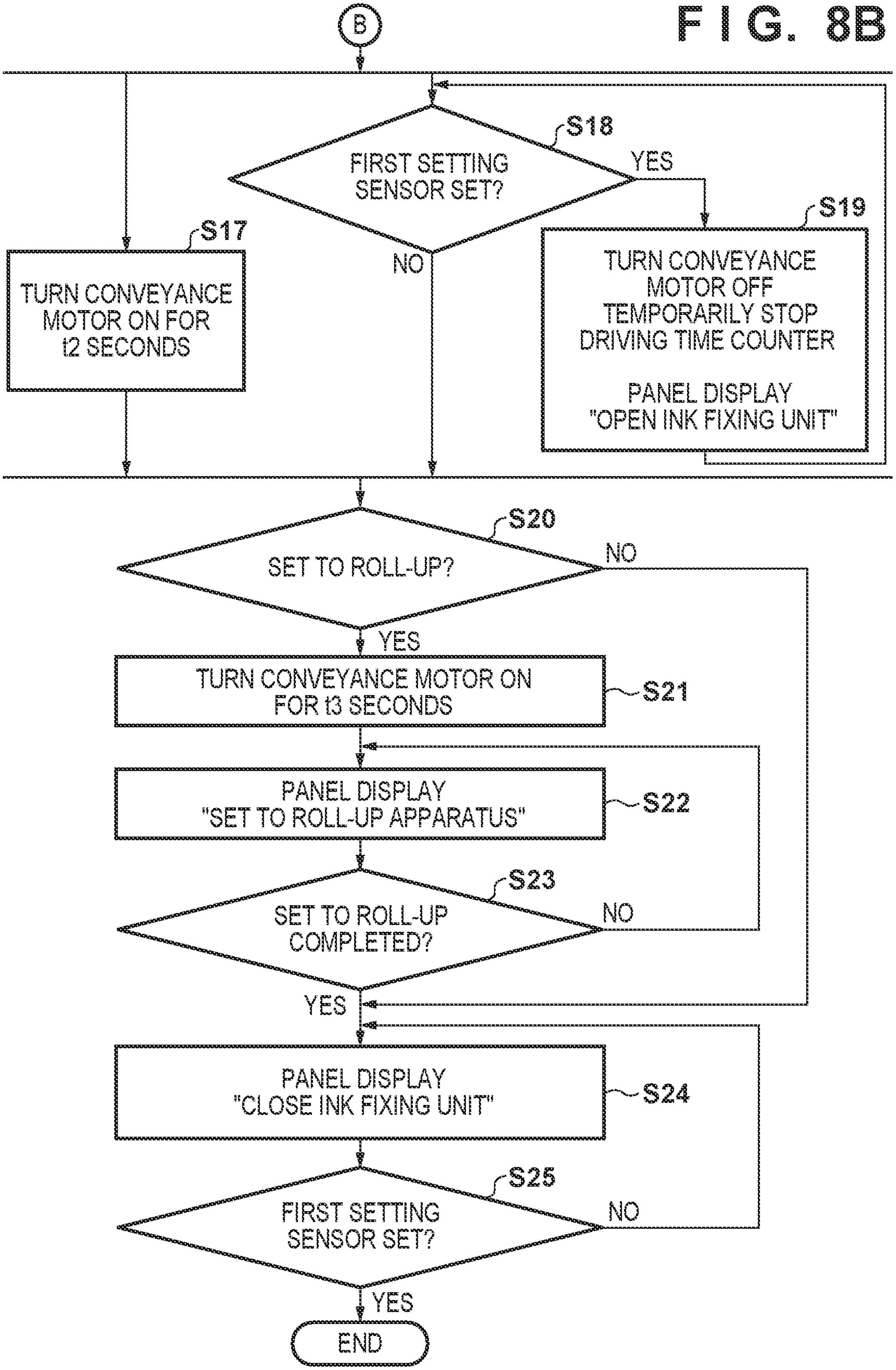
FIG. 8B is a flowchart illustrating the setting operation of the roll shape print medium.
Figures 1, 9A:
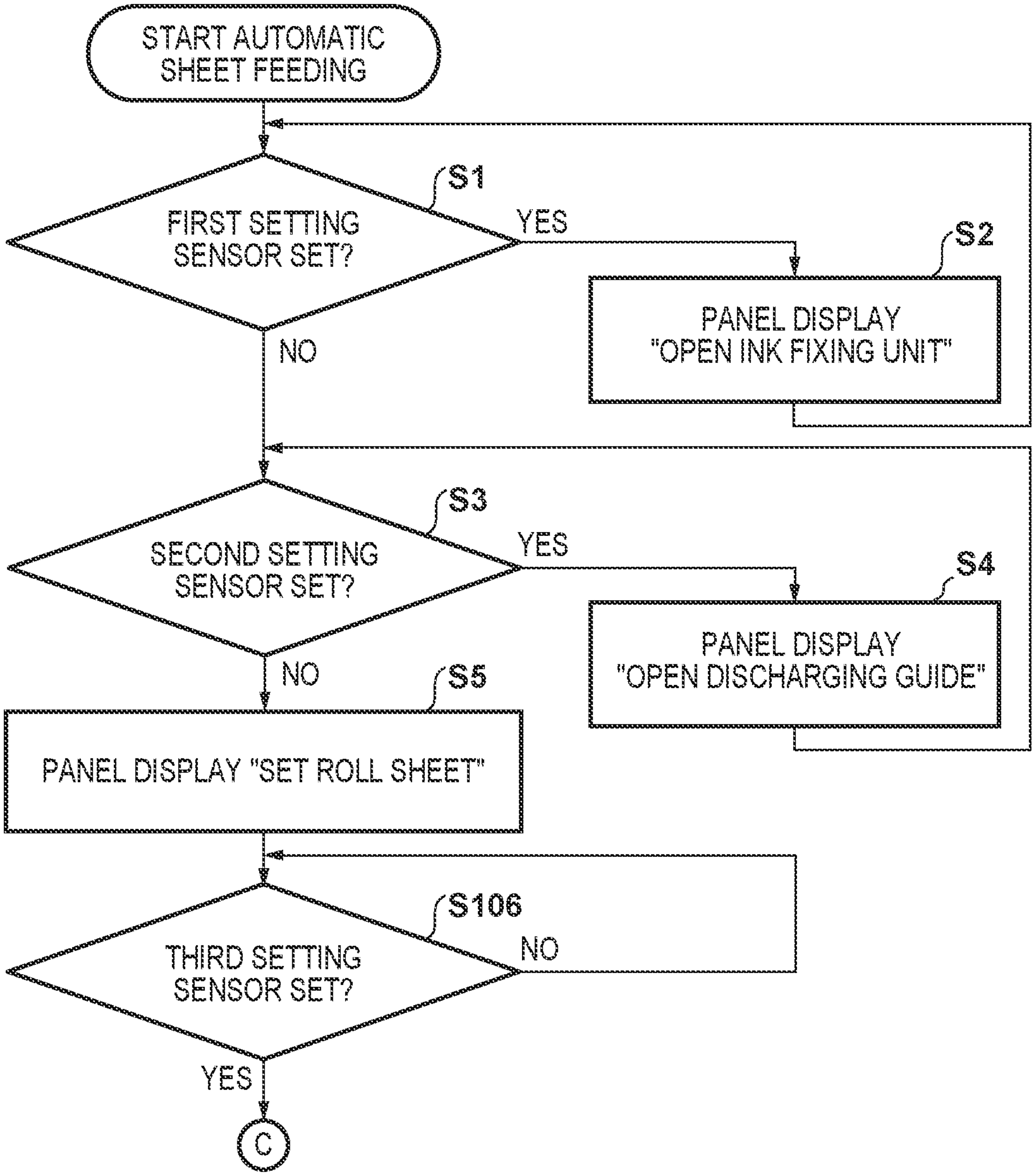
Figures 2, 9A:
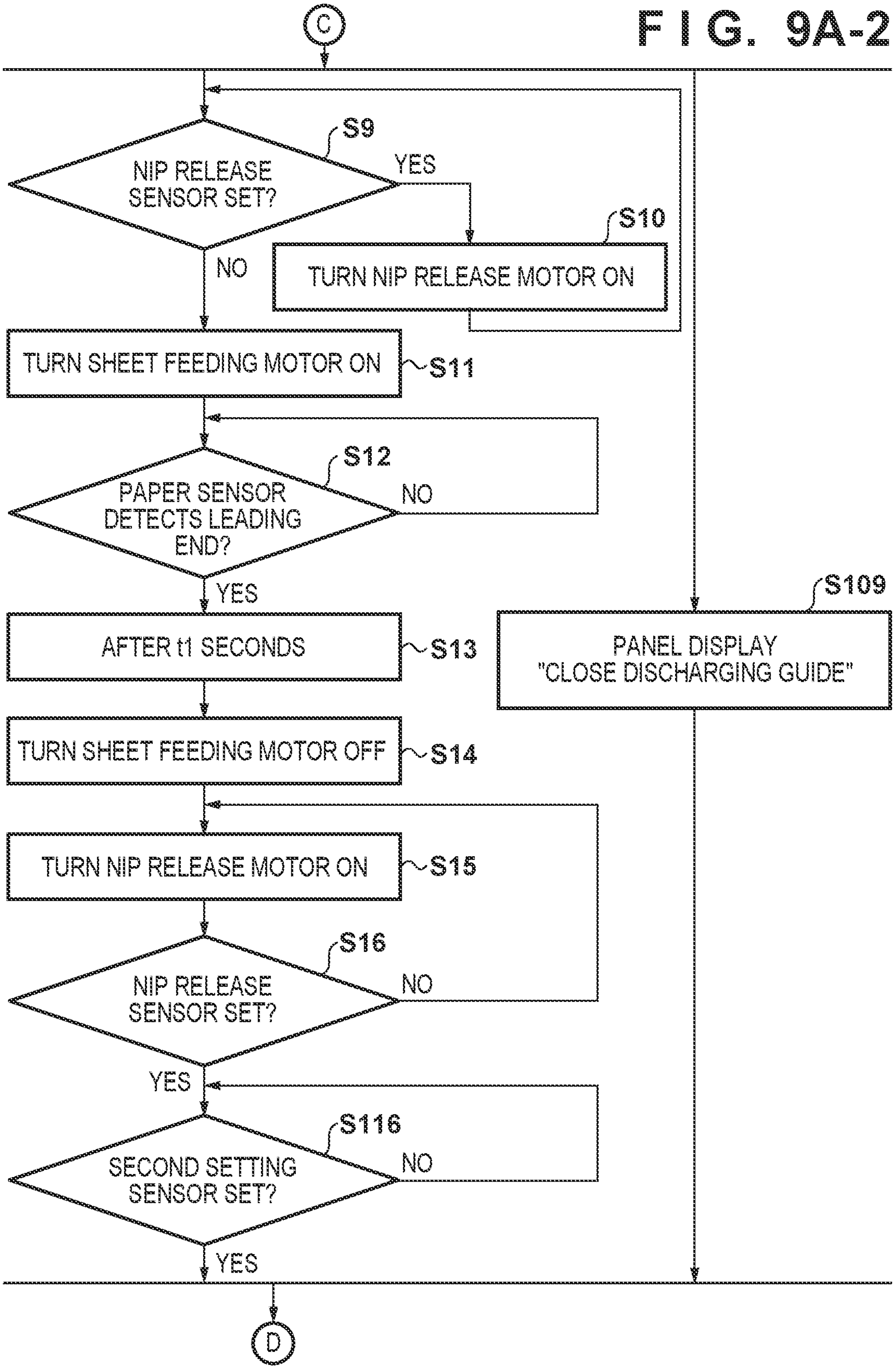
Figure 9B:
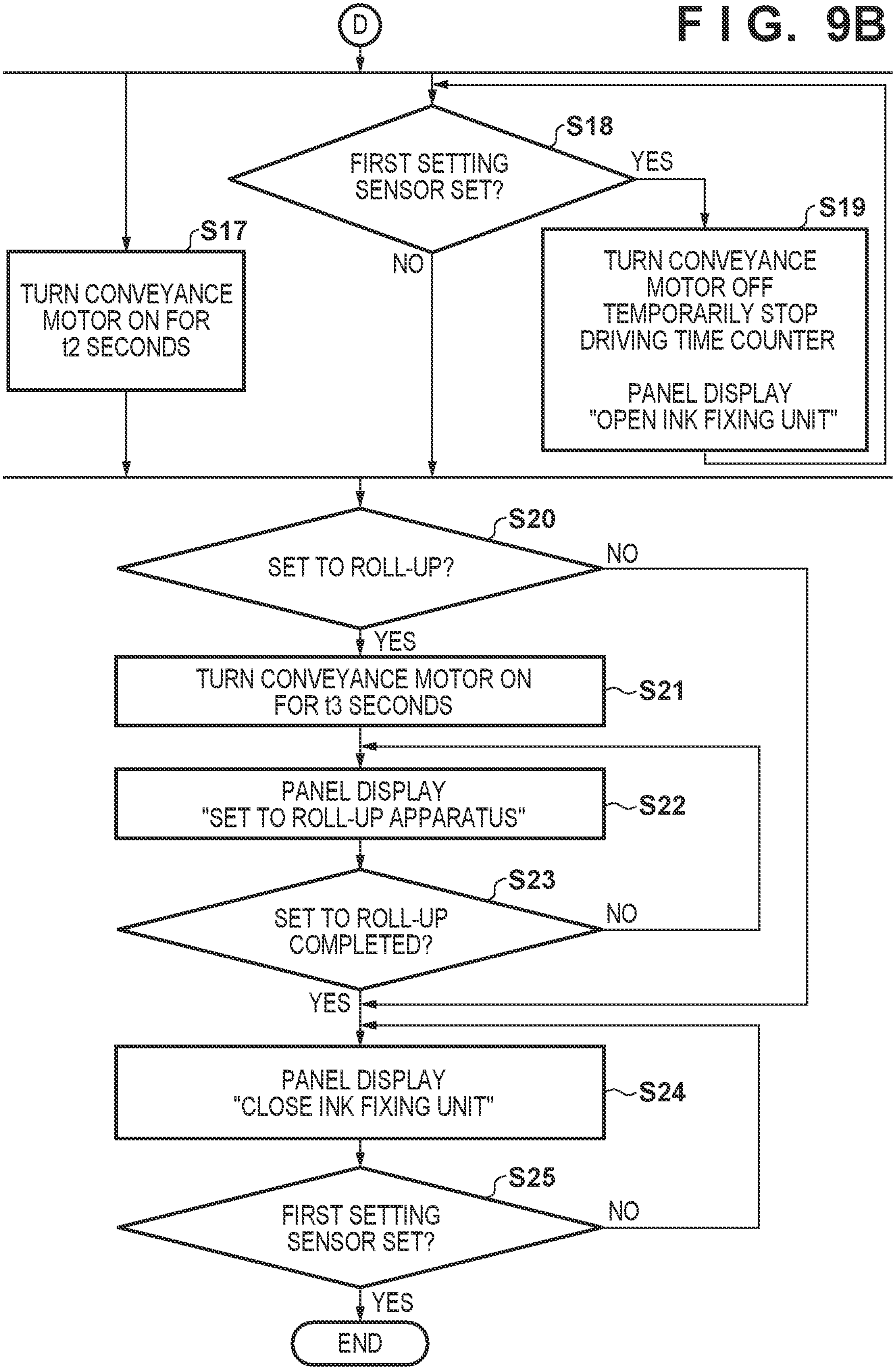
FIG. 9B is a flowchart illustrating another example of the setting operation of the roll shape print medium.

Here, in a case where the ink fixing unit 300 is erroneously closed by the user during the conveyance operation, the conveyance motor 703 and the counting of the driving time is temporarily stopped, and "open the ink fixing unit" is displayed on the operation panel 28 (S18 to S19 in FIG. 8B).

As has been described above, the gap distance between the ink fixing unit 300 and the discharging guide unit 500 cannot be widened, in order to efficiently perform ink fixing by the ink fixing unit 300. Furthermore, as the print medium 1 has been wound to the roll shape print medium 10, the print medium 1 is still curled, and therefore it is difficult for the leading end of the print medium 1 to enter the gap between the ink fixing unit 300 and the discharging guide unit 500 in conveying the print medium 1, and thus the paper jam may easily occur. On the other hand, the ink fixing unit 300, in the present embodiment, is always retracted upward to the retracted position as illustrated in FIG. 6, in conveying the print medium 1 to the discharging guide unit 500. Therefore, it is possible to prevent the print medium 1 from abutting the ink fixing unit 300 and causing paper jam.

Next, the user selects whether or not to set the print medium 1 to the roll-up roll 520 serving as a roll-up apparatus (S20 in FIG. 8B). At this time, a selection screen may be displayed on the operation panel 28. When it is selected not to set, "close the ink fixing unit" is displayed on the operation panel 28 (S24 in FIG. 8B). Subsequently, when the ink fixing unit 300 is closed by the user (S25 in FIG. 8B), as illustrated in FIG. 4, setting of the roll shape print medium 10 is completed and printing is enabled.

When the print medium 1 is set to the roll-up roll 520, the CPU 600 first drives the conveyance motor 703 for t3 seconds to draw corresponding amount of the print medium 1 for setting to the roll-up roll 520 (S21 in FIG. 8B). Next, "set to the roll-up apparatus" is displayed on the operation panel 28, and the user is prompted to set the end of the print medium 1 to the roll-up apparatus (S22 in FIG. 8B). Upon detecting completion of setting (S23 in FIG. 8B), the CPU 600 displays "close the ink fixing unit" on the operation panel 28 (S24 in FIG. 8B). Subsequently, when the ink fixing unit 300 is closed by the user (S25 in FIG. 8B), as illustrated in FIG. 4, setting of the roll shape print medium 10 is completed and printing is enabled.

Figure 7:
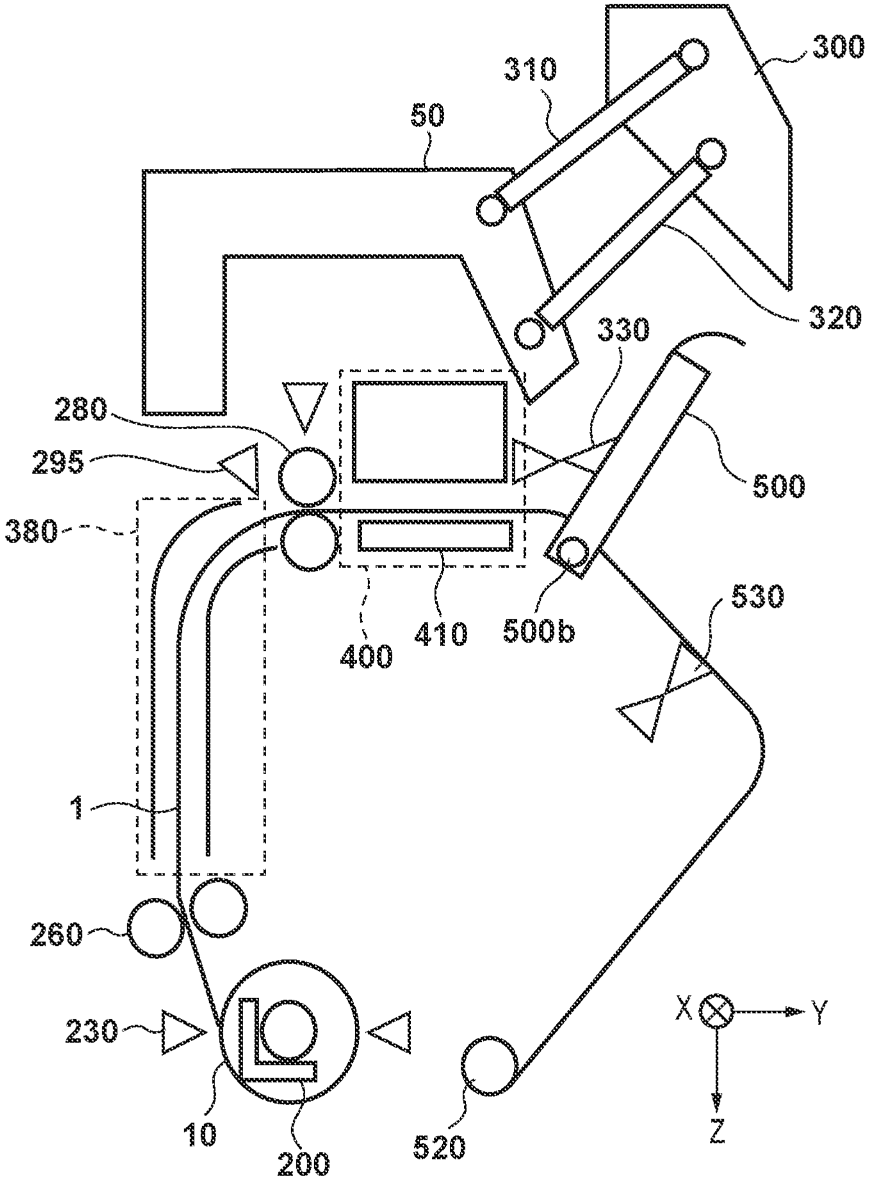
FIG. 7 is a schematic cross-sectional diagram of the main part of the printing apparatus.

Although not described above, when the discharging guide unit 500 is unexpectedly moved to the retreated position in the setting operation of the roll shape print medium 10, the paper jam may occur. FIG. 7 illustrates the aforementioned state. FIG. 7 will be described later.

Next, a different mode of the setting operation of the roll shape print medium according to the first embodiment will be described, referring to the flowcharts of FIGS. 9A-1, 9A-2 and FIG. 9B. Here, same operation steps as that of FIGS. 8A-1, 8A-2 and FIG. 8B are indicated by the same step numbers and description thereof will be omitted, and only different parts from FIGS. 8A-1, 8A-2 and FIG. 8B will be described.

First, the operation steps S1 to S5 are similar to those of FIG. 8A-1.

When the third setting sensor 230 detects at step S106 that the roll shape print medium 10 is set (S106 in FIG. 9A-1), the operation of steps S9 to S16 in FIG. 8A-2 is performed in parallel with displaying "close the discharging guide" on the operation panel. Although it is checked that the discharging guide unit 500 is closed at step S8 before step S9 in FIG. 8A-2, the operation is performed in FIG. 9A-2 at step S116 after step S16.

When the second setting sensor 530 detects at step S116 that the paper guide unit 500 is closed, the CPU 600 drives the conveyance motor 703 to guide the print medium 1 to the discharging guide unit 500 (step S17). The following operation is similar to that of steps S17 to S25 in FIG. 8B.

In the flowcharts of FIGS. 9A-1, 9A-2 and FIG. 9B, by performing the sheet feeding operation of the print medium 1 in parallel with the operation of closing the discharging guide unit 500 by the user, the time required for the setting operation of the print medium 1 can be reduced.

Although the sheet feeding operation has been described as automatic sheet feeding using various motors in the first embodiment, the present disclosure is not limited thereto and can be applied to manual sheet feeding operation. In such a case, the sheet feeding motor 701 and the nip release motor 704 are not provided, and the user manually feeds the print medium 1 to the platen 410 and manually operates a nip release lever (not illustrated) to shift the conveyance roller pair 280 to a nipping state.

Although the above description has explained that the display to the user is performed by the operation panel 28 provided in the apparatus main body 1, the present disclosure is not limited thereto. For example, display may be performed on a screen of a PC, a smartphone, or the like connected to the printing apparatus 100. The presentation is not limited to characters or figures, sound, light, vibration, or the like may be used to give notification to the user.

As such, since only the ink fixing unit 300 can be moved to the retracted position in setting the leading end of the print medium at the sheet feeding position, it becomes possible to widen the gap between the ink fixing unit 300 and the discharging guide unit 500. Accordingly, occurrence of paper jam can be prevented in setting the leading end of the print medium 1 on the discharging guide unit 500.

Second Embodiment

In the first embodiment, the example is described in which the conveyance motor 703 and the counting of the driving time is temporarily stopped and "open the ink fixing unit" is displayed on the operation panel 28, in a case where the ink fixing unit 300 is carelessly set to the fixing position when the leading end of the print medium 1 passes through the discharging guide unit 500. In contrast, in a second embodiment, an example of providing a mechanism configured to lock the opening and closing of the ink fixing unit 300 in a state where the ink fixing unit 300 is retracted to the retracted position will be described. In the present embodiment, description of same parts as those of the first embodiment are omitted, and only different parts will be described.

Figure 10:
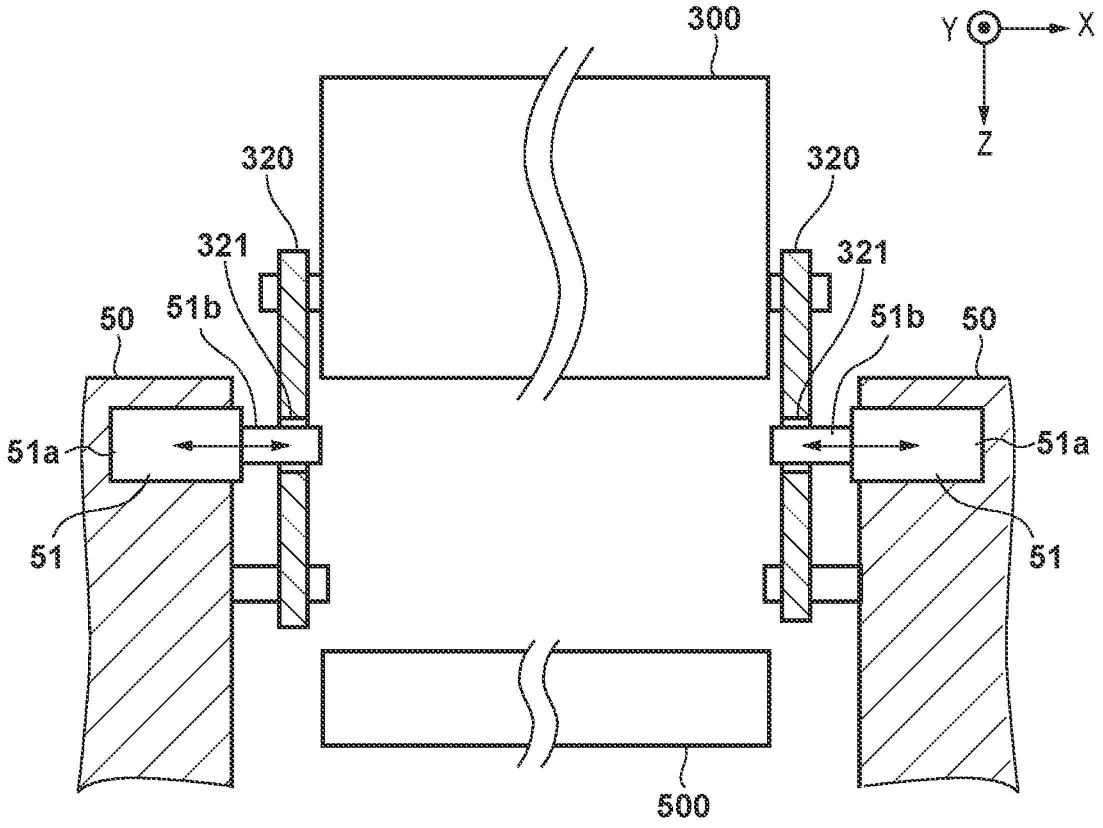
FIG. 10 is a cross-sectional diagram of the main part of a printing apparatus according to a second embodiment.

FIG. 10 is a diagram illustrating a configuration of a lock mechanism of the ink fixing unit 300. In FIG. 10, a first lock solenoid 51, which is a lock solenoid of the ink fixing unit 300, includes a fixing unit 51*a* fixed to the apparatus main body, and a driving unit 51*b* configured to perform projecting and pull-in operations with respect to the fixing unit 51*a*. On the other hand, a second link 320 includes a lock hole 321 that can be engaged with the driving unit 51*a* when the ink fixing unit 300 is in the retracted position. The ink fixing unit 300 is locked at retracted position by the driving unit 51*a* entering into the lock hole 321 of the second link 320 at the retracted position of the ink fixing unit 300.

Figure 11:
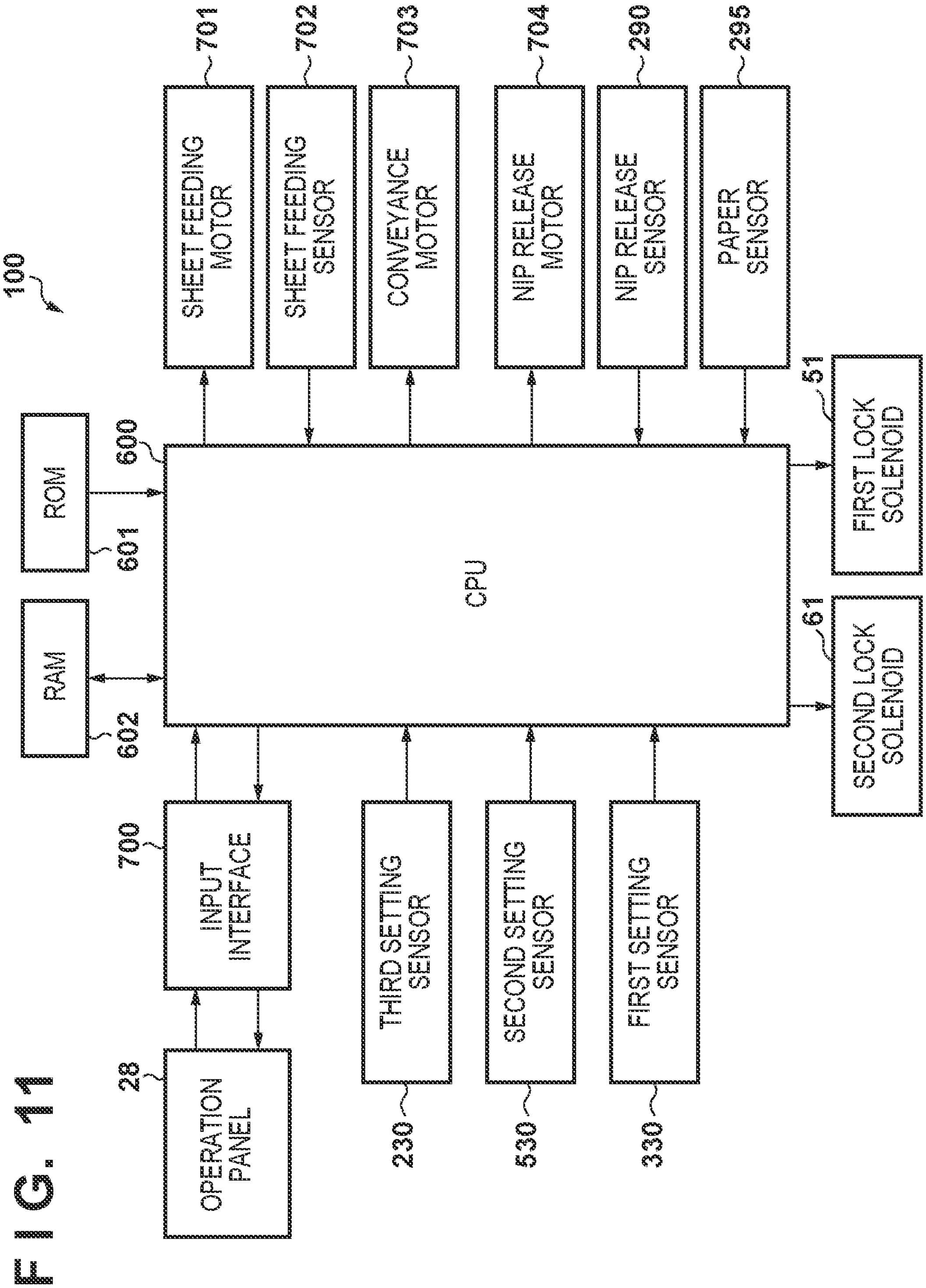
FIG. 11 is a block diagram of the printing apparatus according to the second embodiment.

FIG. 11 is a block diagram illustrating a block configuration of the printing apparatus 100 according to the second embodiment. In the second embodiment, the first lock solenoid 51 and a second lock solenoid 61 described below are connected to the CPU 600, in addition to the configuration of the first embodiment illustrated in FIG. 3.

FIGS. 12A-1, 12A-2 and FIG. 12B are flowcharts illustrating the setting operation of the roll shape print medium 10. Here, same operation as that of FIGS. 8A-1, 8A-2 and FIG. 8B illustrating the first embodiment are indicated by same step numbers and description thereof will be omitted, and only different parts from FIGS. 8A-1, 8A-2 and FIG. 8B will be described.

The operation steps S1 to S16 are similar to those of FIGS. 8A-1 and 8A-2.

At step S217, the CPU 600 determines whether or not the ink fixing unit 300 is located at the fixing position or the retracted position by the detection of the first setting sensor 330. When the ink fixing unit 300 is located at the fixing position, "open ink fixing unit" is displayed on the operation panel 28 (S218 in FIG. 12B).

Figures 1, 12A:
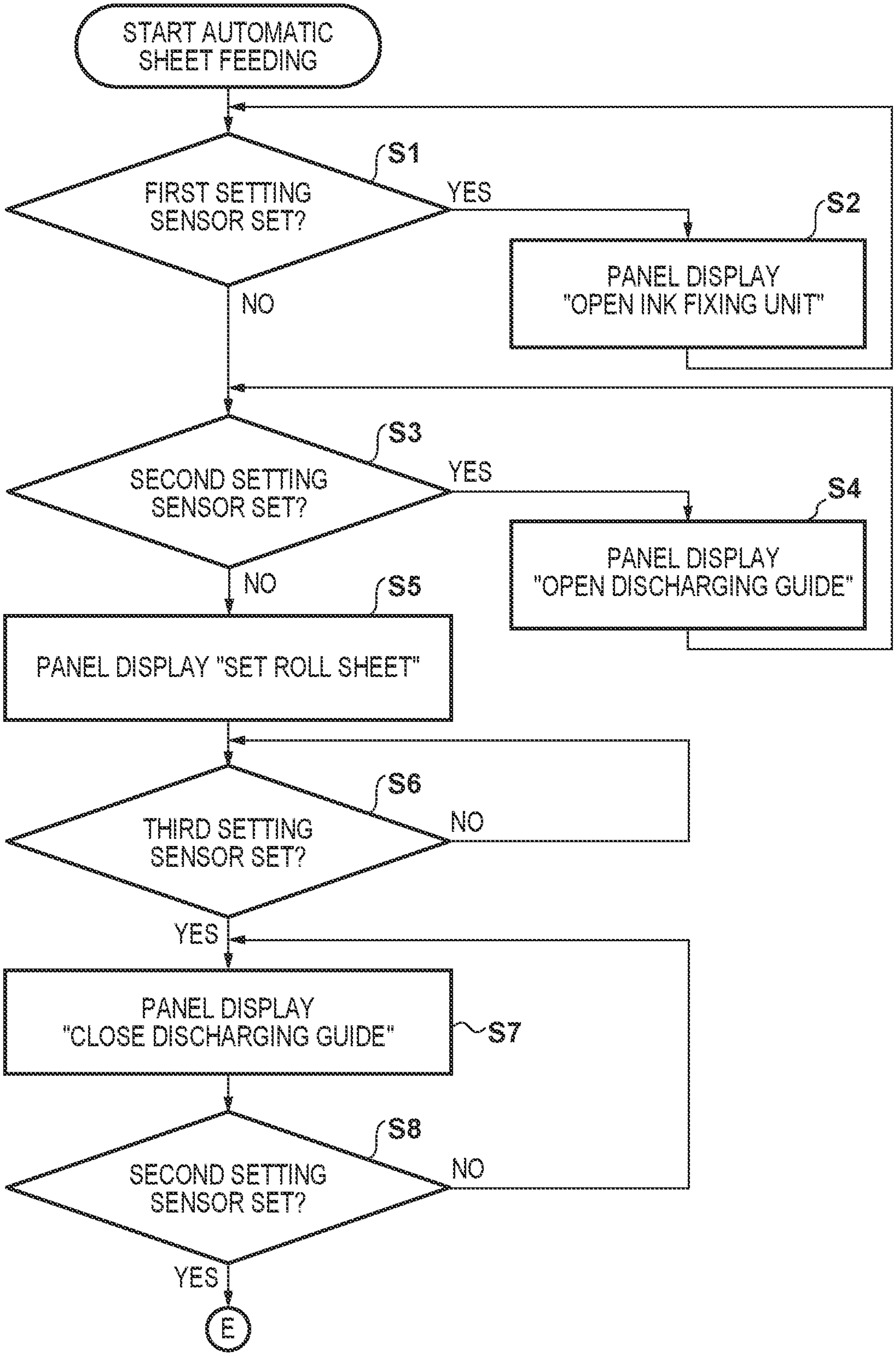
Figures 2, 12A:
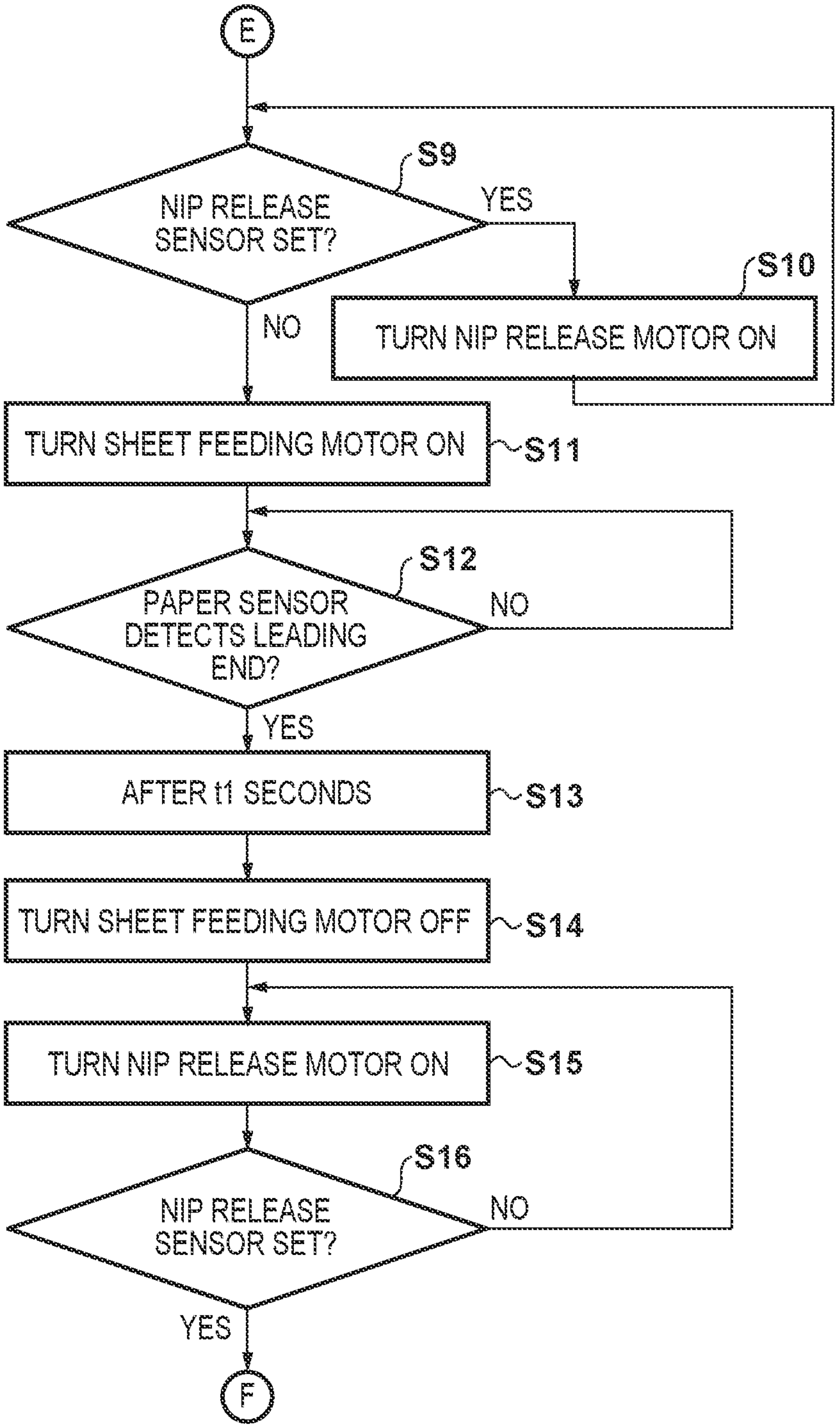
Figure 12B:
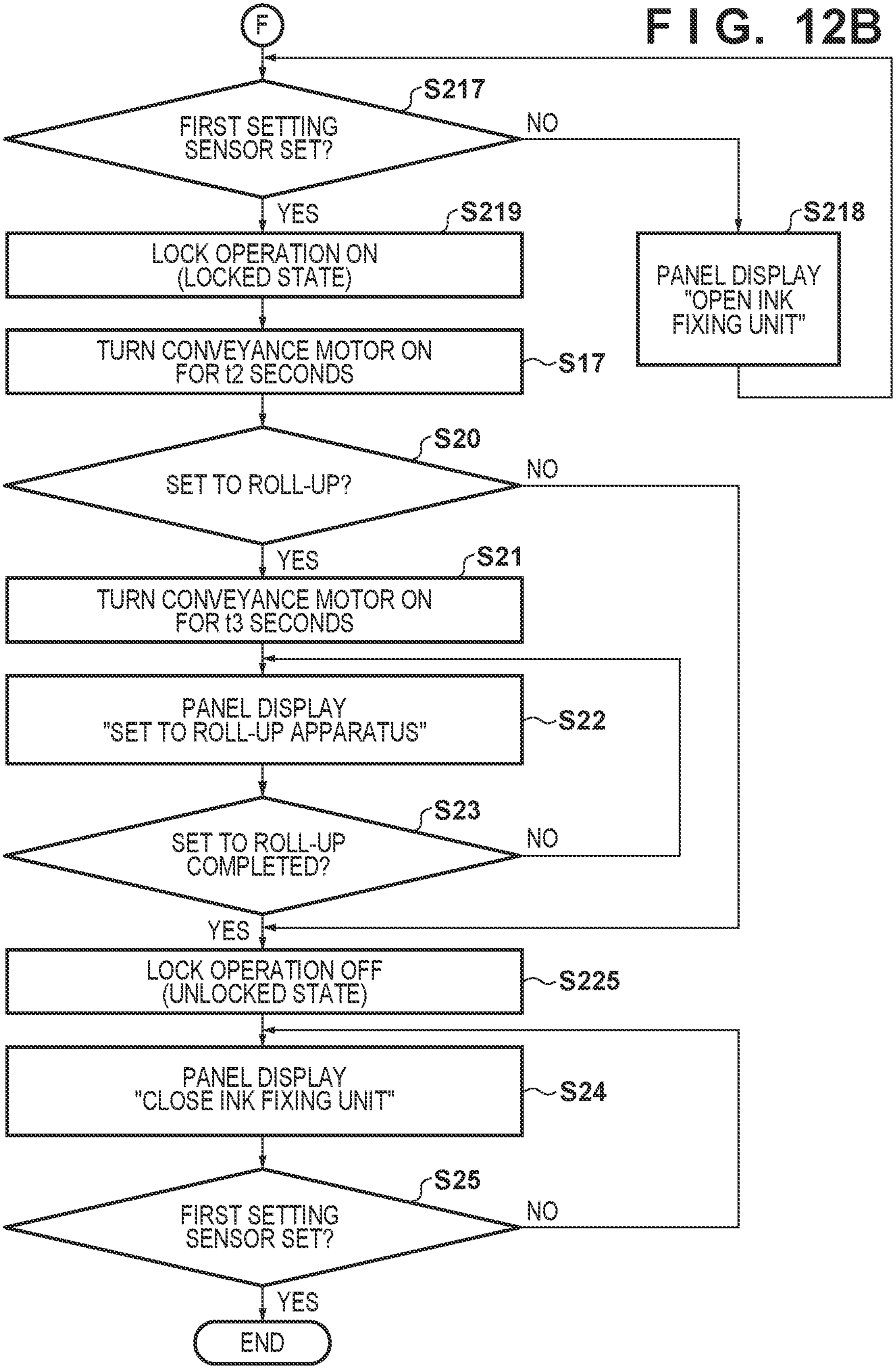
FIG. 12B is a flowchart illustrating the setting operation of the roll shape print medium according to the second embodiment.

Subsequently, the first lock solenoid 51 is driven to engage the driving unit 51*b* with the lock hole 321, in a state where the ink fixing unit 300 is located at the retracted position, and locks the ink fixing unit at the retracted position (S219 in FIG. 12B).

Subsequently, the print medium 1 is conveyed by the conveyance motor 703 as in the steps S17 and S20 to S23, and the print medium 1 is set to a printable state. When the conveyance and setting of the print medium 1 is completed, the lock of the ink fixing unit 300 by the first lock solenoid 51 is released (S225 in FIG. 12B), and "close the ink fixing unit" is displayed on the operation panel 28 (S24 in FIG. 12B). When the ink fixing unit 300 is closed, setting is completed and printing is enabled (S25 in FIG. 12B).

Providing the lock mechanism in the aforementioned manner can prevent the ink fixing unit 300 being carelessly set at the fixing position when the leading end of the print medium 1 passes through the discharging guide unit 500. Although an example has been described, in which a lock hole that engages with the fixing unit 51*a* is provided in the second link, the lock hole may be provided in the first link 310 or the ink fixing unit 300.

Note that, not only the ink fixing unit 300, but when the discharging guide unit 500 is unexpectedly moved to the retreated position in the setting operation of the roll shape print medium 10, as illustrated in FIG. 7, the paper jam may occur. In the present embodiment, a mechanism configured for locking opening and closing of the discharging guide unit 500 is also provided.

Figure 13:
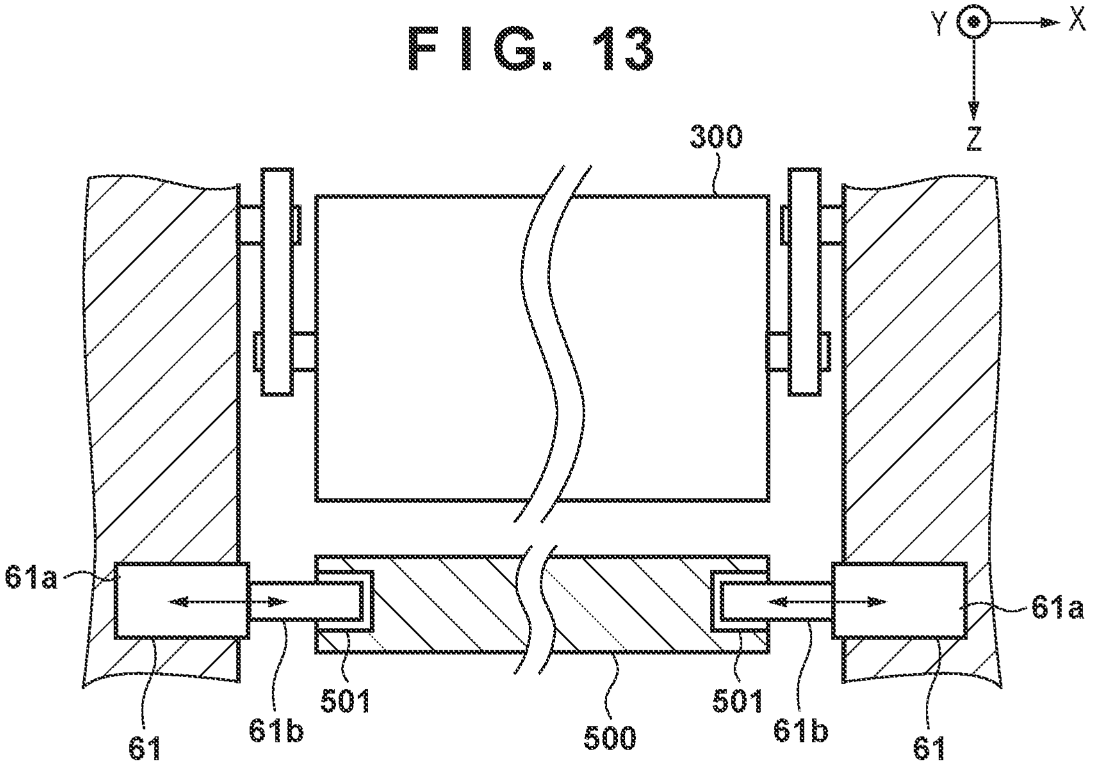
FIG. 13 is a cross-sectional diagram of the main part of the second embodiment.

FIG. 13 is a diagram illustrating a configuration of a lock mechanism of the discharging guide unit 500. In FIG. 13, the second lock solenoid 61, which is the lock solenoid of the discharging guide unit 500, includes a fixing unit 61*a* fixed to the apparatus main body and a driving unit 61*b* configured to perform projecting and pull-in operation with respect to the fixing unit 61*a*. On the other hand, the discharging guide unit 500 includes a lock hole 501 that can engage with the driving unit 61*a* when the discharging guide unit 500 is located at the fixing position. The discharging guide unit 500 is locked at the fixing position by the driving unit 61*a* entering into the lock hole 501 of the discharging guide unit 500 at the fixing position of the discharging guide unit 500.

In the present embodiment, a lock mechanism configured for preventing occurrence of paper jam in the setting operation of the roll shape print medium 10 has been described above. However, in order to prevent occurrence of paper jam during the printing operation, a mechanism configured for locking opening and closing of the ink fixing unit 300 at the fixing position may be provided. Furthermore, a mechanism configured for locking the discharging guide unit 500 at the retracted position may also be provided. In addition, it may suffice to provide either the locking mechanism of the ink fixing unit 300 or the locking mechanism of the discharging guide unit 500 according to the present embodiment.

Third Embodiment

<Seating of Ink Fixing Unit 300>

As has been described above, it is necessary to uniformly send hot air from the ink fixing unit 300 to the print medium 1 at any region, in order to ensure good ink fixability without thermal unevenness. And therefore, it is necessary to maintain the distance (hereinafter referred to as a gap) between the bottom surface of the ink fixing unit 300 and the upper surface of the discharging guide unit 500 to be constant without inclination. In the third embodiment, therefore, a configuration for maintaining the gap with a high accuracy without inclination when the ink fixing unit 300 is set at the fixing position will be described, referring to FIG. 14 to FIG. 18. Here, components similar to those of the first embodiment are indicated by same reference symbols, and the description thereof will be omitted.

As with the first embodiment, the retracting mechanism of the ink fixing unit 300 employs a parallel-link configuration using the first link 310 and the second link 320. Thereby a compact moving operation is realized without occupying a large moving area. Similarly to the first embodiment, the aforementioned parallel-link configuration is arranged in a similar configuration at both end portions in the longitudinal direction (the X-direction) of the ink fixing unit 300.

A first link fulcrum 310*a* and a second link fulcrum 320*a*, which are respective fulcrums of the first link 310 and the second link 320, are provided in the ink fixing unit 300, and the other fulcrums are provided in the apparatus main body 50. These link fulcrums are constituted by a shaft and a bearing.

In order to maintain the gap with a high accuracy, the front side of the discharging guide unit 500 and the back side of the ink fixing unit 300 are brought into abutment with each other at an abutment unit 540. According to the aforementioned configuration, only the front sides of the abutment unit 540 and the discharging guide unit 500, and the back side of the abutment unit 540 and the ink fixing unit 300 need to be finished with a high accuracy, it is possible to easily improve the accuracy without interposing a large number of components. It is desirable to provide the abutment unit 540 at a position that do not interfere with the print medium 1 being conveyed, and it is preferred to provide, for example, two abutment units 540 forming a pair at outside of the end portion of the print medium 1 in the width direction (X-direction).

Figure 14:
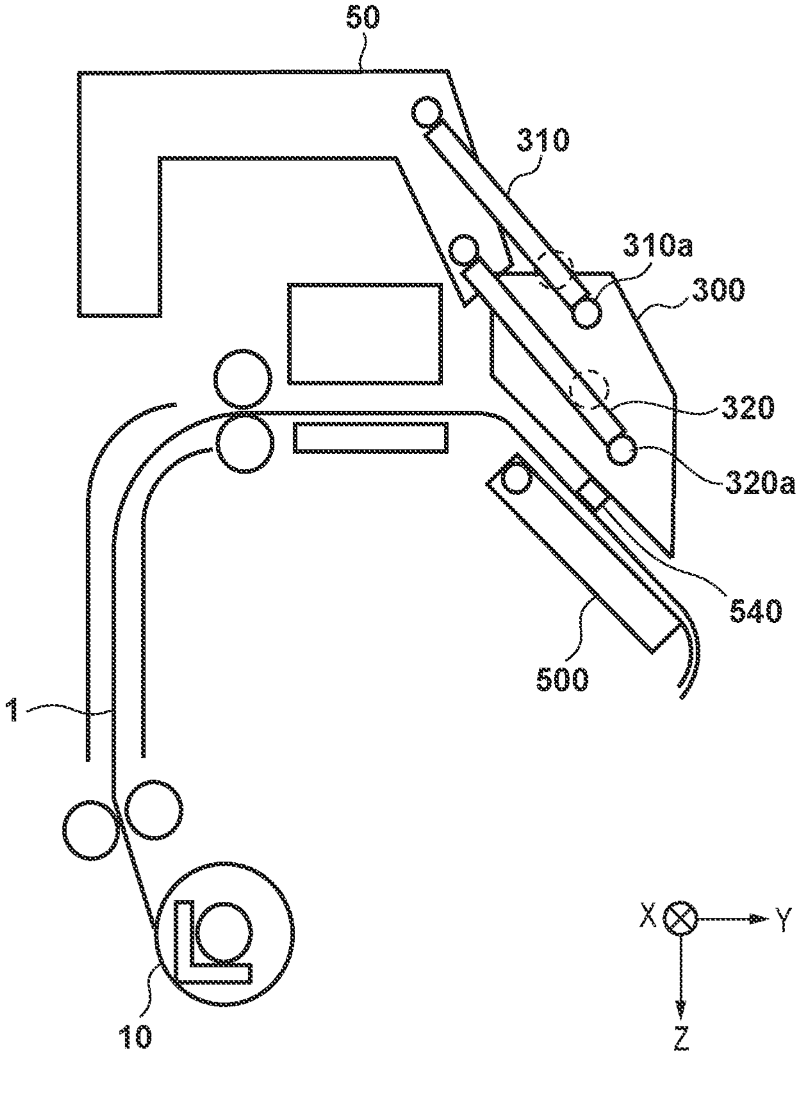
FIG. 14 is schematic diagram for explaining a problem in a third embodiment.

However, the aforementioned configuration has the following problem. First, let us consider a case where only one abutment unit 540 is provided in the conveying direction of the print medium 1. Here, two of the abutment units 540 may be provided at same positions in the conveyance direction of the print medium 1 which are different positions in the X-direction (at both outsides of the print medium 1 being conveyed). FIG. 14 is a schematic diagram illustrating a case where only one abutment unit 540 is provided. When the ink fixing unit 300 is set at the fixing position, the position of the ink fixing unit 300 is fixed by the position of the abutment unit 540 and the two fulcrum positions of the first link fulcrum 310*a* and the second link fulcrum 320*a*. The positions of the link fulcrums are fixed with a large number of interposing components, and therefore the positional accuracy may vary. For example, if the position of the fulcrum deviates upward in FIG. 14 (broken line), the downstream side of the ink fixing unit 300 may rise and the gap may widen. In this case, the fixing efficiency at the downstream side is deteriorated, and thus fixing unevenness may occur.

Figure 15:
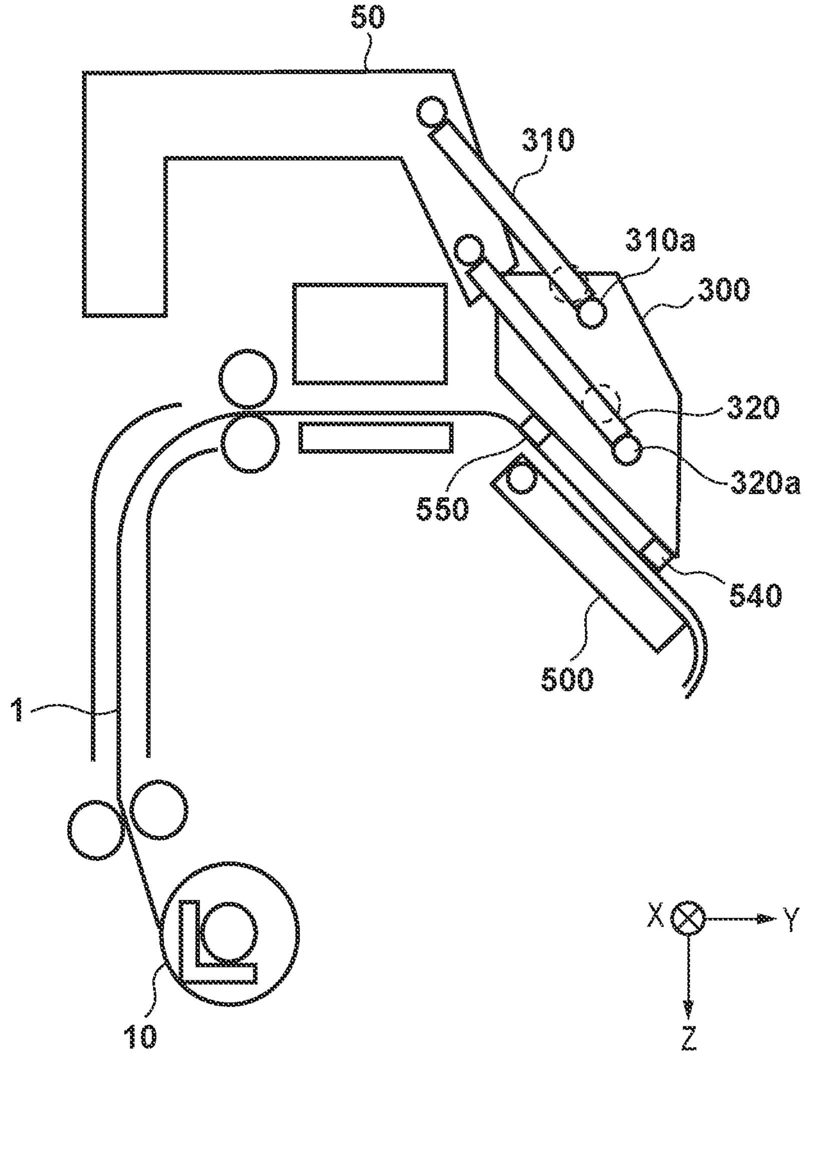
FIG. 15 is schematic diagram for explaining the problem in the third embodiment.

Next, let us consider a case where a total of two abutment units 540, one at the upstream side and the other one at the downstream side in the conveyance direction of the print medium 1 are provided. FIG. 15 is a schematic diagram illustrating a case where two abutment units 540 are provided in the conveyance direction of the print medium 1. Although only two abutment units are illustrated in FIG. 15, two more abutment units may be provided at same positions in the conveyance direction at rear side in the X-direction. Similarly, the position of the ink fixing unit 300 is fixed by the positions of the two abutment units (the first abutment unit 540 and the second abutment unit 550) and the two fulcrum positions of the first link fulcrum 310*a* and the second link fulcrum 320*a*. However, since the aforementioned case is a four point support, this support will be partial contact in which one of the two abutment units does not abut. For example, if the fulcrum deviates upward in FIG. 15 (broken line), the second link 320 may strut in a state where only the first abutment unit 550 at the upstream side is abutting, and the downstream side may be prevented from moving downward. And thus, the first abutment unit 540 no longer abuts. Accordingly, the gap at the downstream side of the ink fixing unit 300 is widened, and the fixing efficiency at the downstream side is deteriorated, and thus fixing unevenness may occur.

As such, the gap may not be kept constant in any case where one or two abutment units are provided in the conveying direction of the print medium 1.

The present embodiment therefore has the following configuration in order to keep a constant gap with a high accuracy. First, the ink fixing unit 300 and the discharging guide unit 500 are configured to be movable to positions different from those at the time of printing, and the ink fixing unit 300 and the discharging guide unit 500 can move individually by respectively including moving units. In addition, a parallel-link mechanism including two links at one side is used as a moving unit of the ink fixing unit 300. The foregoing scheme is as already described. In the present embodiment, at least one abutment unit at each of the upstream side and the downstream side in the conveyance direction of the print medium 1 is further provided in the ink fixing unit 300. It is preferable to respectively provide at least one abutment unit similarly at a rear side in the X-direction. Furthermore, the ink fixing unit 300 is configured to be supported being swingable in setting the ink fixing unit 300, making the two abutment units being brought into abutment with the discharging guide unit 500.

Details of the configuration of the link mechanism that allows the ink fixing unit 300 to swing will be described, referring to a schematic cross-sectional diagram illustrated in FIG. 16A and a main-part enlarged diagram illustrated in FIG. 16B.

Figure 16A:
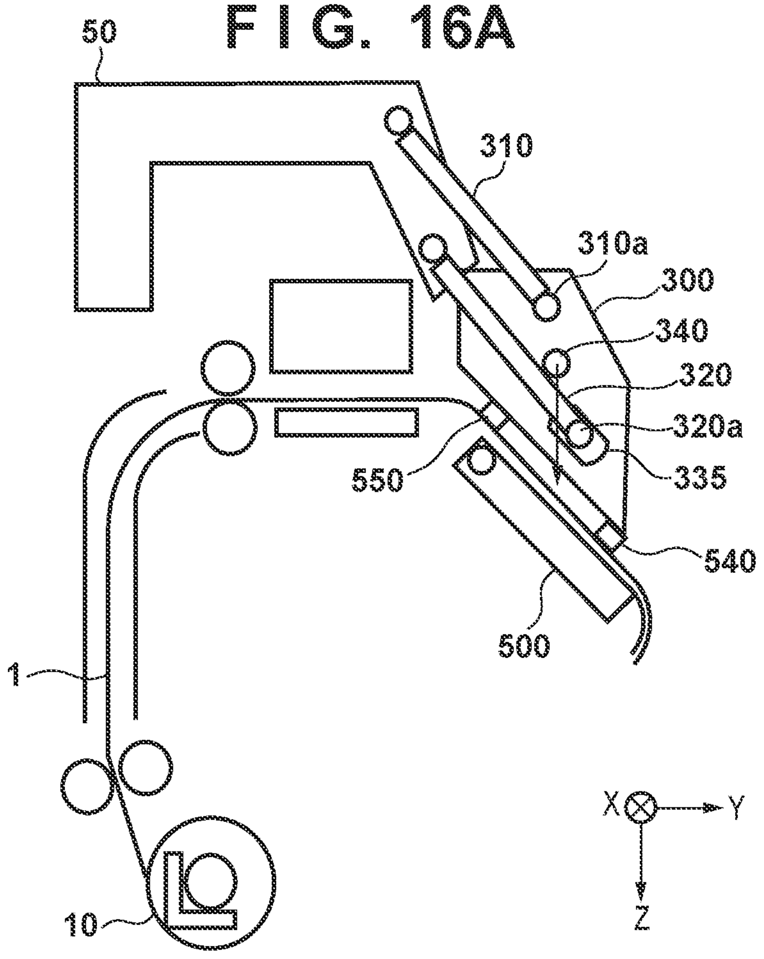
FIG. 16A and FIG. 16B are schematic cross-sectional diagrams of the main part of the third embodiment.
Figure 16B:
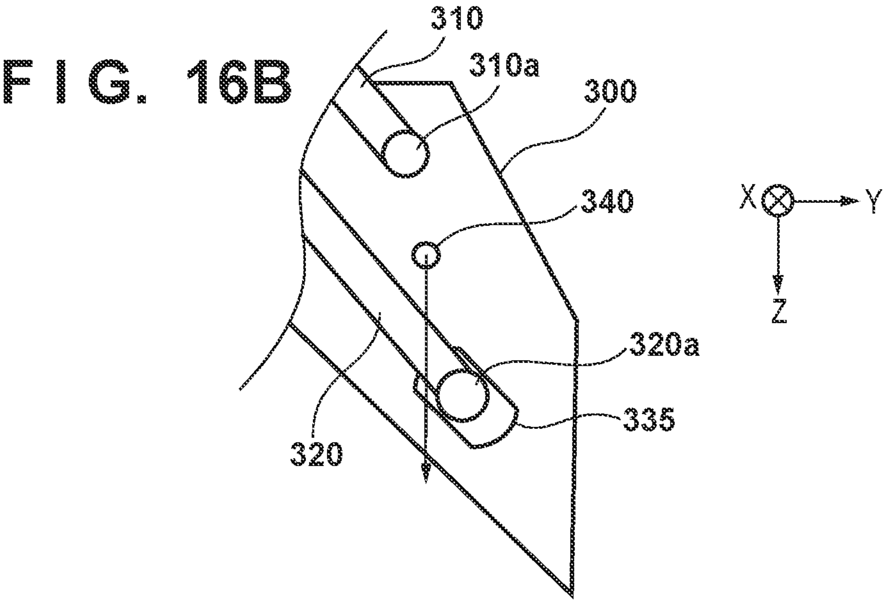

In FIG. 16A and FIG. 16B, the first link fulcrum 310*a* is axially supported by the ink fixing unit 300 enabling only rotation. On the other hand, the second link fulcrum 320*a* is axially supported by a slotted hole (loose fitting hole) 335 enabling rotation and relative movement of the second link 320 with respect to the ink fixing unit 300 in the longitudinal direction.

In setting the ink fixing unit 300 at the fixing position, the second abutment unit 550 provided in the ink fixing unit 300 firstly abuts the discharging guide unit 500. The second link fulcrum 320*a* is relatively movable with respect to the ink fixing unit 300 owing to the slotted hole 335. Accordingly, even if the position of the fulcrum of the second link 320 varies depending on component tolerance, the second link 320 does not strut and can tolerate swing of the ink fixing unit 300. In this case, as the center of gravity 340 of the ink fixing unit 300 is located midway between the first link fulcrum 310*a* and the second link fulcrum 320*a*, the ink fixing unit 300 swings clockwise in FIG. 16A and FIG. 16B due to its own weight, and the first abutment unit 540 also abuts the discharging guide unit 500. As such, a two-point abutment is ensured, whereby the gap is maintained at a constant distance with a high accuracy.

In other words, by configuring the ink fixing unit 300 to be swingable with respect to the discharging guide unit 500, the gap can be maintained at a constant distance with a high accuracy.

Next, another example of supporting the ink fixing unit 300 to be swingable will be described, referring to FIG. 17.

Figure 17:
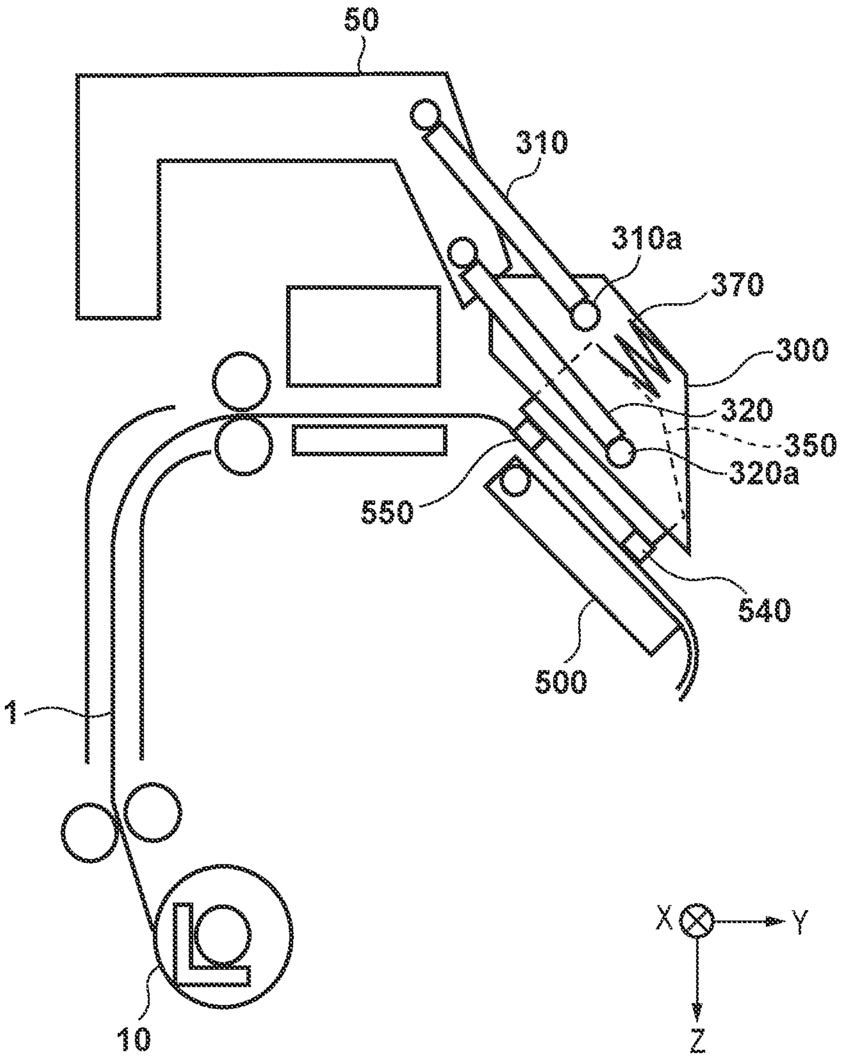
FIG. 17 is a schematic cross-sectional diagram of the main part of another example of the third embodiment.

In FIG. 17, the ink fixing unit 300 includes a chamber 350 configured to blow out hot air and a frame 360 which is a frame body of the ink fixing unit 300, and the chamber 350 is movable upward and downward with respect to the frame 360. Further, the chamber 350 is biased downward with respect to the frame 360 by a biasing spring 370.

Two fulcrums of the first link fulcrum 310*a* and the second link fulcrum 320*a* are provided in the frame 360, and the first abutment unit 540 and the second abutment unit 550 are provided in the chamber 350. In setting the ink fixing unit 300 to the fixing position, as the chamber 350 swings with respect to the frame 360 by the biasing spring 370, the two abutment units (the first abutment unit 540 and the second abutment unit 550) abut the discharging guide unit 500. Thus, the gap can be maintained at a constant distance with a high accuracy.

In addition, yet another example of the swing mechanism will be described, referring to FIG. 18.

Figure 18:
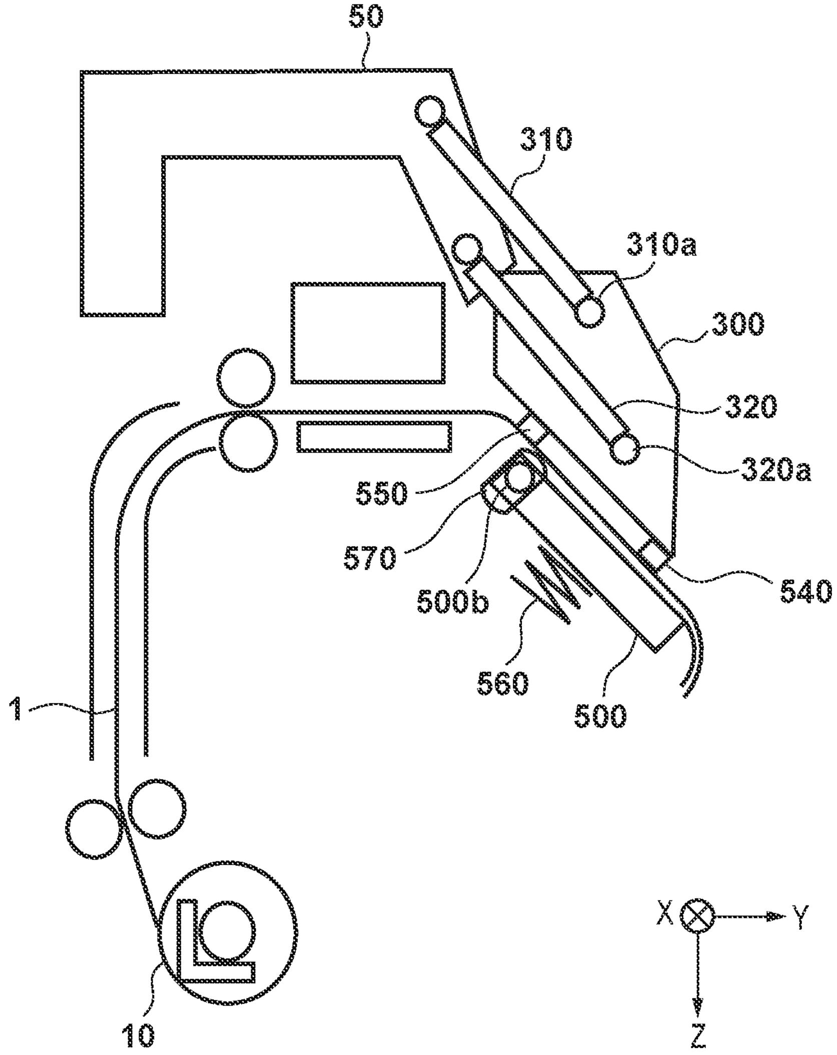
FIG. 18 is a schematic cross-sectional diagram of the main part of another example of the third embodiment.

In FIG. 18, the discharging guide unit 500 is pivotable with respect to the apparatus main body at the discharging guide unit shaft 500*b*. In addition, the fitting hole in the apparatus main body for the discharging guide unit shaft 500*b* is a slotted hole 570 (loose fitting hole) which is elongated in the vertical direction. Accordingly, the discharging guide unit 500 can move upward and downward. Furthermore, the discharging guide unit 500 is biased upward by a biasing spring 560. Two fulcrums of the first link fulcrum 310*a* and the second link fulcrum 320*a* are provided in the ink fixing unit 300, and the first abutment unit 540 and the second abutment unit 550 are provided in the ink fixing unit 300. And in setting the ink fixing unit 300 to the fixing position, as the discharging guide unit 500 swings with respect to the apparatus main body by the biasing spring 560, the two abutment units (the first abutment unit 540 and the second abutment unit 550) abut the discharging guide unit 500. Thus, the gap can be maintained at a constant distance with a high accuracy.

As such, two abutment units are provided to the ink fixing unit 300 and the discharging guide unit 500, and also the ink fixing unit 300 and the discharging guide unit 500 are supported to be swingable relative to each other. Accordingly, it becomes possible to bring the two abutment units into abutment between the ink fixing unit 300 and the discharging guide unit 500, whereby the gap can be maintained at a constant distance with a high accuracy. And thus, fixing unevenness can be suppressed. The examples of the third embodiment described above can be combined with all the examples disclosed in the first embodiment and the second embodiment.

Fourth Embodiment

<Retracting Mechanism of Safety Cover 390>

Since the temperature of the ink fixing unit 300 becomes high during an ink fixing operation, it is desirable from the viewpoint of user protection to provide a safety cover 390 that prevents the user's hand from touching the ink fixing unit 300 from the downstream side of the ink fixing unit 300. The safety cover 390 needs to be arranged to secure a minimum opening height through which the print medium can pass, while preventing the user from touching the ink fixing unit 300. In a case where the safety cover 390 described above is arranged at the downstream side of the ink fixing unit 300, there is a risk that the safety cover 390 may collide with the discharging guide unit 500 and the safety cover 390 and the safety cover 390 may be destroyed, when the discharging guide unit 500 is moved to the retracted position after the ink fixing unit 300 is moved to the retracted position. Therefore, in the fourth embodiment, a configuration for preventing the safety cover 390 from being destroyed when the discharging guide unit 500 is retracted will be described, referring to FIG. 19A to FIG. 21B. Here, components identical to those of the first embodiment to the third embodiment are indicated by same reference symbols, and the description thereof will be omitted.

Figure 19A:
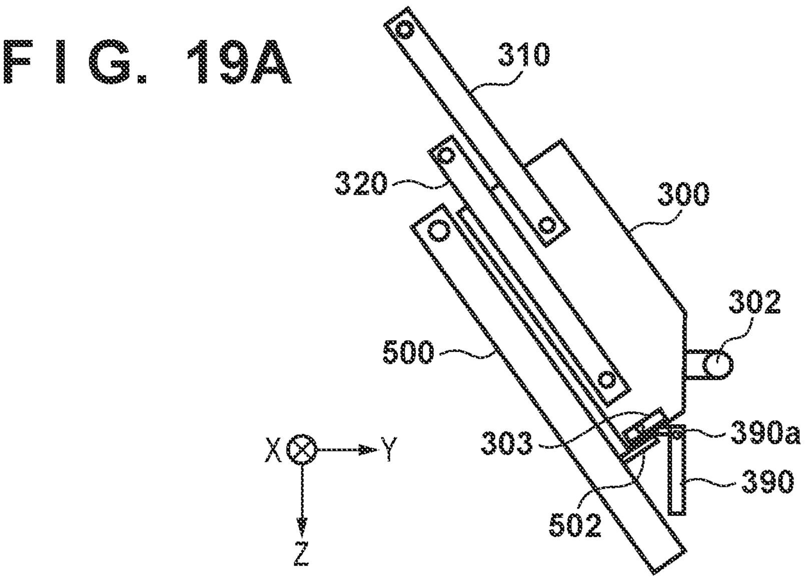
FIG. 19A and FIG. 19B are schematic cross-sectional diagrams of the main part of a fourth embodiment.

As illustrated in FIG. 19A, the safety cover 390 configured in a shape covering the opening to prevent the user's hand from entering the opening formed between the ink fixing unit 300 and the discharging guide unit 500 is arranged at a downstream side of the ink fixing unit 300. The safety cover 390 is configured to be pivotable about a safety cover rotation fulcrum 390*a* provided in the ink fixing unit 300. In addition, the safety cover 390, which is biased in a closing direction by a biasing spring (not illustrated), normally maintains a closed state.

In the vicinity of the safety cover 390, a cover opening and closing member 303 configured for opening and closing the safety cover 390 is adjacently arranged. The cover opening and closing member 303 is configured to be pivotable by being pushed by an arm member 502 provided in the discharging guide unit 500, when the discharging guide unit 500 moves to the retracted position. The pivoting causes the safety cover 390 to move in the opening direction.

Figure 19B:
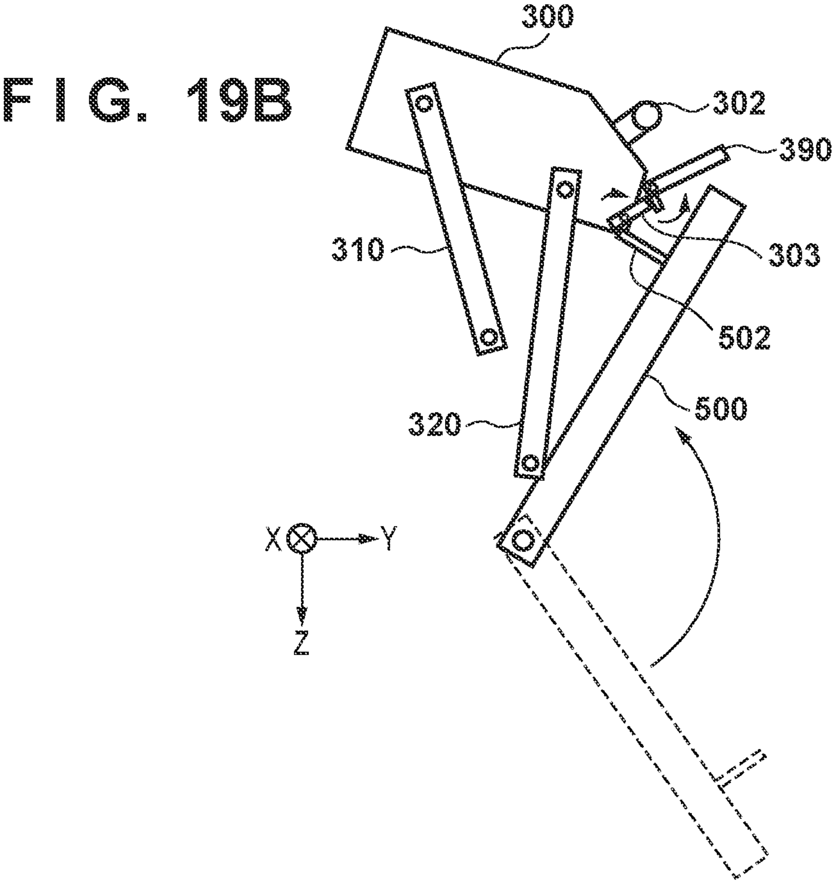

According to the aforementioned configuration, the arm member 502 provided in the discharging guide unit 500 pushes the cover opening and closing member 303 when the discharging guide unit 500 moves to the retracted position after the ink fixing unit 300 has moved to the retracted position, as illustrated in FIG. 19B. Along with the foregoing movements, the cover opening and closing member 303 opens the safety cover 390. Accordingly, it becomes possible to retract the safety cover 390 before the discharging guide unit 500 collides with the safety cover 390.

Furthermore, the safety cover 390 in the configuration is arranged in a manner covering the operation handle 302 when the safety cover 390 is opened, making it difficult for the user to access the operation handle 302 at the retracted position. Therefore, it is also possible to prevent the ink fixing unit 300 from raising or lowering operation, in a state where the discharging guide unit 500 is located at the retracted position.

Next, another configuration example of the safety cover will be described, referring to FIG. 20A and FIG. 20B.

Figure 20A:
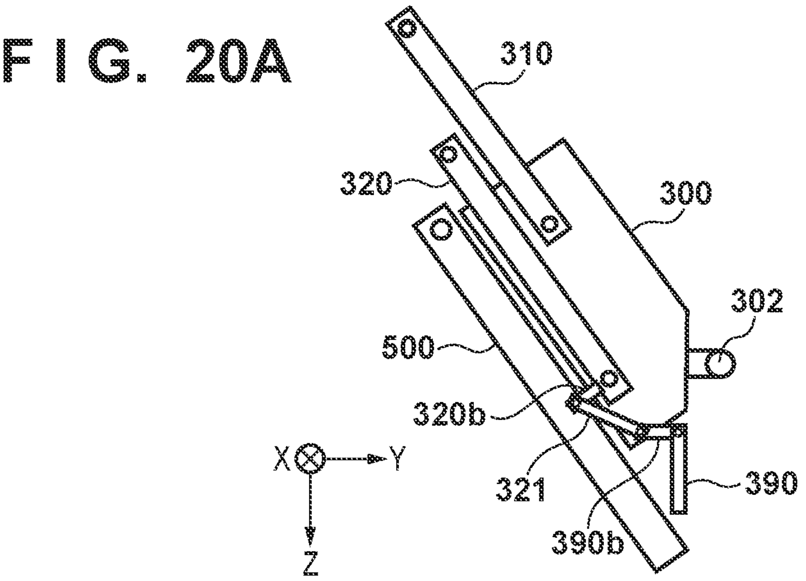
FIG. 20A and FIG. 20B are schematic cross-sectional diagrams of the main part of another example of the fourth embodiment.

As illustrated in FIG. 20A, the safety cover 390 is arranged at the downstream side of the ink fixing unit 300 to be pivotable about the safety cover rotation fulcrum, similarly to the case of FIG. 19A and FIG. 19B. A leading end of an arm 390*b*, which is a part of the safety cover 390, is rotatably connected to one end of a cover opening and closing link 321. The other end of the cover opening and closing link 321 is rotatably connected to a leading end of an arm 320*b* which is a part of the second link 320.

Figure 20B:
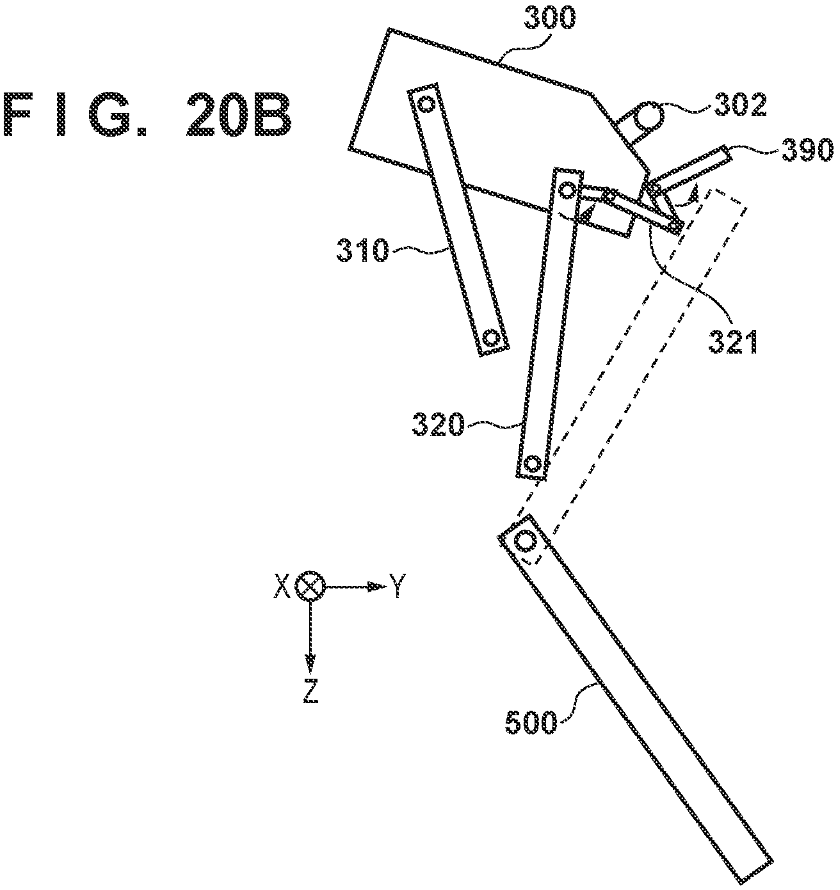

According to the aforementioned link connection, the safety cover 390 is held in close state under the normal state, whereas the safety cover 390 is pivoted by the cover opening and closing link 321 to the open state under the retracted state of the ink fixing unit 300, as illustrated in FIG. 20B. It is therefore possible to reliably avoid collision even if the discharging guide unit 500 is raised.

In addition, still another example will be described, referring to FIG. 21A and FIG. 21B.

Figure 21A:
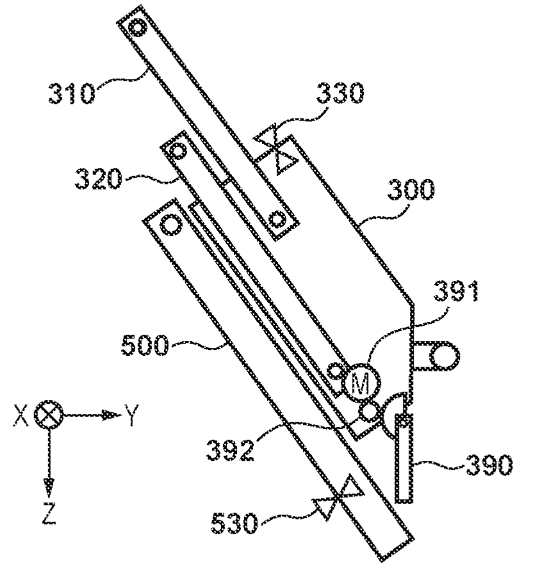
FIG. 21A and FIG. 21B are schematic cross-sectional diagrams of the main part of another example of the fourth embodiment.

As illustrated in FIG. 21A, the safety cover 390 is arranged at the downstream side of the ink fixing unit 300 in a pivotable manner about the safety cover rotation fulcrum, similarly to the cases of FIG. 19A and FIG. 19B. A cover opening and closing motor 391 is arranged in the vicinity of the safety cover 390, whereby the safety cover 390 is rotationally driven by a gear train 392 which is a driving force transfer mechanism.

Figure 21B:
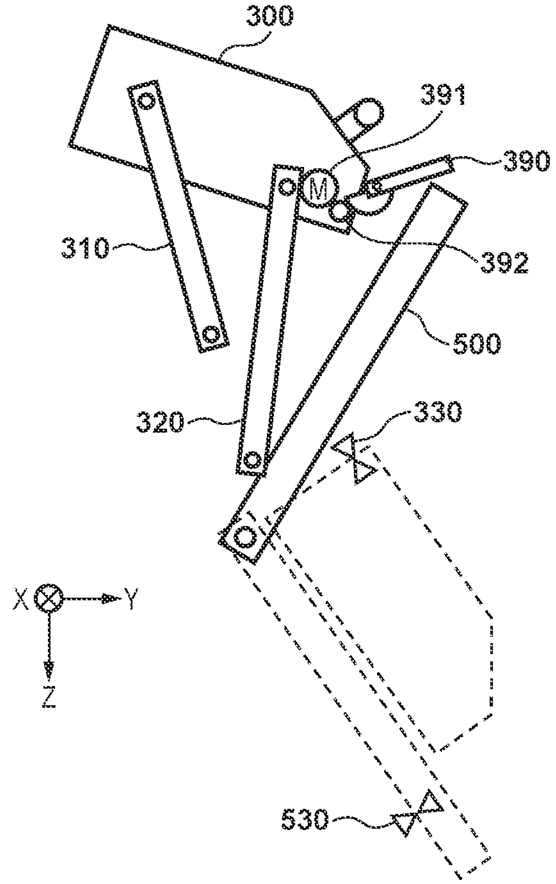

As illustrated in FIG. 21B, the ink fixing unit 300 and the discharging guide unit 500 includes the first setting sensor 330 and the second setting sensor 530 described above. When the sensors detect that the ink fixing unit 300 or the discharging guide unit 500 has moved from the fixing position to the retracted position, the safety cover 390 is controlled to rotate in the opening direction by the cover opening and closing motor 391. When the sensors detect that the ink fixing unit 300 or the discharging guide unit 500 has moved from the retracted position and returned to the fixing position, the safety cover 390 is controlled to rotate in the closing direction by the cover opening and closing motor 391.

Although an example in which the force of the motor is transferred via the gear train 392 to open and close the safety cover 390 has been described in the present embodiment, the present disclosure is not limited thereto. For example, the movement of the gear train may be converted to cam operation to open and close the cover via the cam, or operation of an actuator such as a solenoid may be directly transferred to the cover to open and close.

As such, the present embodiment includes a mechanism that retracts the safety cover 390 in conjunction with an operation of the ink fixing unit 300 or the discharging guide unit 500 rising toward the retracted position. Accordingly, it is possible to prevent the safety cover 390 and the discharging guide unit 500 from colliding with each other when the discharging guide unit 500 moves to the retracted position, even when the safety cover 390 for user protection is provided to the opening formed by the ink fixing unit 300 and the discharging guide unit 500. The examples of the fourth embodiment described above can be combined with all the examples disclosed in the first embodiment to the third embodiment.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2023-027511, filed Feb. 24, 2023, which is hereby incorporated by reference herein in its entirety.

What is claimed is:

1. A printing apparatus comprising:

a drying unit configured to be movable to a first operating position where a print medium subjected to printing by a printing unit is dried, and to a first retracted position retracted from the first operating position; and a supporting unit provided facing the drying unit and configured to be movable independently of the drying unit to a second operating position where the print medium to be dried by the drying unit is supported, and to a second retracted position retracted from the second operating position.

2. The printing apparatus according to claim 1, wherein the print medium is loaded on the printing apparatus in a state where the drying unit is moved to the first retracted position and the supporting unit is moved to the second retracted position.

3. The printing apparatus according to claim 2, wherein the print medium is loaded on the printing apparatus in a state of being wound in a roll shape.

4. The printing apparatus according to claim 2, further comprising a control unit configured to give a notification to a user prompting to set a print medium in a state where the drying unit is located at the first retracted position and the supporting unit is located at the second retracted position.

5. The printing apparatus according to claim 2, further comprising a control unit configured to give a notification to a user prompting to move the supporting unit to the second retracted position after the drying unit is moved to the first retracted position.

6. The printing apparatus according to claim 2, further comprising:

a setting detection unit configured to detect that the print medium is set in the printing apparatus; and a control unit configured to give a notification to a user prompting to move the supporting unit to the second operating position after the setting detection unit has detected that the print medium is set.

7. The printing apparatus according to claim 1, further comprising a conveying unit configured to convey the print medium toward the drying unit, wherein the conveying unit conveys the print medium to the supporting unit, in a state where the drying unit is moved to the first retracted position and the supporting unit is moved to the second operating position.

8. The printing apparatus according to claim 7, further comprising a control unit configured to give a notification to a user prompting to move the drying unit to the first operating position after the print medium is conveyed to the supporting unit by the conveying unit.

9. The printing apparatus according to claim 1, further comprising:

a roll-up unit configured to roll up the print medium subjected to printing by the printing unit; and a control unit configured to give a notification to a user prompting to select whether or not to roll up the print medium to the roll-up unit.

10. The printing apparatus according to claim 1, wherein the printing unit performs printing to the print medium in a state where the drying unit is moved to the first operating position and the supporting unit is moved to the second operating position.

11. The printing apparatus according to claim 1, further comprising a conveying unit configured to convey the print medium toward the drying unit.

12. The printing apparatus according to claim 11, further comprising a first detection unit configured to detect that the drying unit is located at the first operating position, wherein the conveyance unit conveys the print medium toward the supporting unit in a case where the first detection unit has detected that the drying unit is not located at the first operating position.

13. The printing apparatus according to claim 12, wherein the conveying unit stops conveying the print medium in a case where the first detection unit has detected that the drying unit is located at the first operating position.

14. The printing apparatus according to claim 12, further comprising a control unit configured to give a notification to a user prompting to move the drying unit to the first retracted position in a case where the first detection unit has detected that the drying unit is located at the first operating position.

15. The printing apparatus according to claim 11, further comprising a second detecting unit configured to detect that the supporting unit is located at the second operating position, wherein the conveying unit conveys the print medium in a case where the second detecting unit has detected that the supporting unit is located at the second operating position.

16. The printing apparatus according to claim 1, further comprising a locking unit configured to lock the drying unit at the first retracted position.

17. The printing apparatus according to claim 1, further comprising a locking unit configured to lock the supporting unit at the second operating position.

18. The printing apparatus according to claim 1, wherein the drying unit includes a first moving unit including a parallel-link mechanism.

19. The printing apparatus according to claim 18, wherein the first moving unit supports the drying unit to be swingable.

20. The printing apparatus according to claim 1, wherein the drying unit includes a cover at a downstream side in a conveyance direction of a print medium.

* * * * *